(12) United States Patent
Kraft et al.

(10) Patent No.: US 7,711,738 B1
(45) Date of Patent: May 4, 2010

(54) METHOD, SYSTEM AND COMPUTER-READABLE MEDIUM FOR ACCESSING AND RETRIEVING COURT RECORDS, ITEMS AND DOCUMENTS

(75) Inventors: Harold Kraft, Rockville, MD (US); Phyo Win, Rockville, MD (US); Charles DeLauder, Gaithersburg, MD (US)

(73) Assignee: West Services, Inc., Eagan, MN (US)

( * ) Notice: Subject to any disclaimer, the term of this patent is extended or adjusted under 35 U.S.C. 154(b) by 0 days.

(21) Appl. No.: 09/713,600

(22) Filed: Nov. 15, 2000

Related U.S. Application Data

(60) Provisional application No. 60/165,730, filed on Nov. 15, 1999.

(51) Int. Cl.
*G06F 7/00* (2006.01)
*G06F 15/16* (2006.01)

(52) U.S. Cl. .................. 707/752; 707/758; 707/769; 707/770; 709/203

(58) Field of Classification Search ............... 707/1–10, 707/100–102, 104.1, 200–201, 736, 752, 707/758, 769, 770; 715/513; 709/201, 203, 709/224
See application file for complete search history.

(56) References Cited

U.S. PATENT DOCUMENTS

| | | | | |
|---|---|---|---|---|
| 5,418,951 A | * | 5/1995 | Damashek | 707/5 |
| 5,692,176 A | * | 11/1997 | Holt et al. | 707/5 |
| 5,715,443 A | * | 2/1998 | Yanagihara et al. | 707/3 |
| 5,758,324 A | * | 5/1998 | Hartman et al. | 705/1 |
| 5,761,497 A | * | 6/1998 | Holt et al. | 707/5 |
| 5,812,134 A | | 9/1998 | Pooser et al. | 345/848 |
| 5,826,261 A | * | 10/1998 | Spencer | 707/5 |
| 5,832,450 A | * | 11/1998 | Myers et al. | 705/3 |
| 5,832,494 A | * | 11/1998 | Egger et al. | 707/102 |
| 5,859,972 A | * | 1/1999 | Subramaniam et al. | 709/203 |

(Continued)

OTHER PUBLICATIONS

CourtLink Welcome Web page [retrieved from Internet at http://www.courtlink.com/welcome.html, Aug. 26, 1999].

(Continued)

*Primary Examiner*—Miranda Le
(74) *Attorney, Agent, or Firm*—Edwards Angell Palmer & Dodge LLP

(57) ABSTRACT

Systems, methods and computer-readable media using the Internet for submitting search requests for court case records and retrieving court items or documents associated therewith. Users specify a number of search criteria and each search request is stored in a memory to be executed by a server. Stored search requests are selected for executing by the server based on several factors, including the number of times the search request failed, how old the search request is, how busy the court database is and how many phone lines the court database has available for access. When search requests are selected, the server seamlessly accesses the court databases associated with the search requests regardless of whether the court databases are accessible through the Internet or through dial-up connections. Once court databases are accessed, the server executes the search request. Using various data processing algorithms, search request results are parsed, filtered, sorted and analyzed for data consistency so that users may conveniently view and select particular items or documents contained in court case records for retrieval, including purchasing and delivery. Search request results and data processed results are stored for later retrieval.

42 Claims, 21 Drawing Sheets

U.S. PATENT DOCUMENTS

| | | | | |
|---|---|---|---|---|
| 5,870,770 | A | | 2/1999 | Wolfe .......................... 345/805 |
| 5,873,076 | A | * | 2/1999 | Barr et al. ....................... 707/3 |
| 5,873,077 | A | * | 2/1999 | Kanoh et al. .................... 707/3 |
| 5,873,080 | A | * | 2/1999 | Coden et al. .................... 707/3 |
| 5,875,431 | A | * | 2/1999 | Heckman et al. ................ 705/7 |
| 5,907,837 | A | * | 5/1999 | Ferrel et al. ..................... 707/3 |
| 5,915,251 | A | | 6/1999 | Burrows et al. ............. 707/102 |
| 5,920,852 | A | | 7/1999 | Graupe ......................... 706/26 |
| 5,920,886 | A | * | 7/1999 | Feldmeier .................... 711/108 |
| 5,926,812 | A | * | 7/1999 | Hilsenrath et al. .............. 707/5 |
| 5,930,350 | A | * | 7/1999 | Johnson ................. 379/355.06 |
| 6,005,860 | A | * | 12/1999 | Anderson et al. ........... 370/352 |
| 6,058,435 | A | * | 5/2000 | Sassin et al. ................. 719/331 |
| 6,078,923 | A | * | 6/2000 | Burrows ...................... 707/101 |
| 6,105,044 | A | * | 8/2000 | DeRose et al. .............. 715/514 |
| 6,144,991 | A | * | 11/2000 | England ....................... 709/205 |
| 6,240,448 | B1 | * | 5/2001 | Imielinski et al. ............ 709/218 |
| 6,253,198 | B1 | * | 6/2001 | Perkins ........................... 707/3 |
| 6,263,351 | B1 | * | 7/2001 | Wolfe ....................... 715/501.1 |
| 6,289,342 | B1 | * | 9/2001 | Lawrence et al. ................ 707/7 |
| 6,349,132 | B1 | * | 2/2002 | Wesemann et al. ........ 379/88.17 |
| 6,356,898 | B2 | * | 3/2002 | Cohen et al. .................... 707/5 |
| 6,366,650 | B1 | * | 4/2002 | Rhie et al. ............... 379/88.13 |
| 6,470,319 | B1 | * | 10/2002 | Ryan .............................. 705/1 |
| 6,490,579 | B1 | * | 12/2002 | Gao et al. ....................... 707/4 |
| 6,546,119 | B2 | * | 4/2003 | Ciolli et al. ................. 382/104 |
| 6,581,056 | B1 | * | 6/2003 | Rao ................................ 707/5 |
| 6,603,843 | B1 | * | 8/2003 | Hagemann .................. 379/111 |
| 6,640,213 | B1 | * | 10/2003 | Carp et al. ..................... 705/10 |
| 6,718,329 | B1 | * | 4/2004 | Selvin et al. .................. 707/10 |
| 6,731,314 | B1 | * | 5/2004 | Cheng et al. ................ 715/848 |
| 6,792,416 | B2 | * | 9/2004 | Soetarman et al. .............. 707/3 |
| 6,959,326 | B1 | * | 10/2005 | Day et al. .................... 709/217 |
| 7,017,188 | B1 | * | 3/2006 | Schmeidler et al. ........... 726/26 |
| 7,035,914 | B1 | * | 4/2006 | Payne et al. .................. 709/219 |
| 7,051,019 | B1 | * | 5/2006 | Land et al. ...................... 707/4 |
| 2001/0053690 | A1 | * | 12/2001 | Inoue ......................... 455/415 |
| 2002/0065084 | A1 | * | 5/2002 | Kawakami .................. 455/456 |
| 2003/0059032 | A1 | * | 3/2003 | Sato et al. .............. 379/355.01 |

OTHER PUBLICATIONS

CourtLink Web site [retrieved from Internet at http://www.courtlink.com, Oct. 13, 1999].

"Courts Available on Courtlink," Jun. 1999 [retrieved from Internet at http://www.courtlink.com, Oct. 13, 1999].

"What is a Docket?" [retrieved from Internet at http://www.marketspan.com/SampleDocket.html, Nov. 7, 2000].

CaseStream Accessed Through Lexis.com [retrieved from Internet at http://www.lexis.com/research/retrieve?_m67214f8e2118f392a9e9a4cb53f9e111&_fmstr=FULL&docnum=1&_startdoc=1, Nov. 7, 2000].

"Wayne Company Downloads Dockets to Keep Customers Ahead," [retrieved from Internet at http://www.marketspan.com/info/corporateinfo/press/news410.html, Nov. 7, 2000].

"Public Records and Court Dockets" [retrieved from Internet at http://www.westlaw.com/DbOptions/pubrec/, Nov. 7, 2000].

"CourtLink Growth," [retrieved from Internet at http://www.courtlink.com/about/growth.html/, Nov. 7, 2000].

"Welcome to CaseStream," [retrieved from Internet at http://www.marketspan.com/home.html, Nov. 7, 2000].

Friedl, *Mastering Regular Expressions*, pp. 1-30 (1998).

Friedl, J., "Mastering Regular Expressions: Powerful Techniques for Perl and Other Tools," O'Reilly & Associates, Inc., pp. 1-30 (1998).

* cited by examiner

| USERID | |
|---|---|
| Column Name | Condensed Type |
| 171 → CustomerID | int |
| 172 → UserID | char (10) |
| FirmID | int |
| 173 → Password | char (10) |
| 174 → First name | char (20) |
| 175 → Last name | char (20) |
| Title | char (30) |
| Street | varchar (40) |
| Dept | varchar (20) |
| City | char (25) |
| State | char (2) |
| Zip | char (10) |
| Phone | char (12) |
| Fax | char (12) |
| Email | varchar (50) |
| URL | varchar (50) |
| Maiden | varchar (20) |
| Priority | int |
| AcctOpen | datetime |
| AcctActive | binary (1) |
| LastLogin | datetime |
| LoginQuantity | int |
| CreditCardNo | varchar (20) |
| ExpDate | varchar (20) |
| Supervisor | smallint |
| RIS_Approval | int |
| Exp_Date | datetime |
| RIS_Firm_ID | int |
| Update_DT | datetime |
| User_Comment | text |
| RIS_Office_ID | int |
| FedExAcctNo | char (32) |
| RM_No | char (32) |
| AllowTest | int |
| Guest | char (10) |
| Payment | char (10) |
| AdditionalEmail | varchar (255) |

FIG. 2

| SEARCH | |
|---|---|
| Column Name | Condensed Type |
| Search_ID | int |
| CustomerID | int |
| Master_Search_ID | int |
| Priority | int |
| Status | int |
| Search_Type | varchar (20) |
| Court_ID | int |
| Party_Name | varchar (100) |
| Case_No | varchar (20) |
| SS | varchar (11) |
| File_Date | varchar (20) |
| Adversary | varchar (40) |
| Case_Type | varchar (200) |
| Other_1 | varchar (20) |
| Other_2 | varchar (20) |
| Search_Submit_Time | datetime |
| Search_Level | int |
| Recurring_Count | int |
| Retry | smallint |
| SessionID | int |
| LastActivity | datetime |
| Failed_Retry | int |
| ClientChargeNo | varchar (20) |
| Test | int |
| CaseType | char (2) |
| Server | char (50) |
| LastUpdate | datetime |

| Court | |
|---|---|
| Column Name | Condensed Type |
| Court_ID | int |
| Court_Name | varchar (100) |
| State | varchar (2) |
| District | varchar (20) |
| State_Name | varchar (25) |
| BDCN | varchar (1) |
| Abbreviation | varchar (10) |
| Note_1 | text |
| Court_Login_ID | int |
| Search_1_ID | int |
| Search_2_ID | int |
| Search_3_ID | int |
| Search_4_ID | int |
| Search_5_ID | int |
| Search_6_ID | int |
| Search_7_ID | int |
| Search_8_ID | int |
| Search_9_ID | int |
| Search_10_ID | int |
| Note_2 | text |
| Phone_1 | varchar (12) |
| Phone_2 | varchar (12) |
| Phone_3 | varchar (12) |
| Phone_4 | varchar (12) |
| Phone_5 | varchar (12) |
| Retry_1 | int |
| Retry_2 | int |
| Retry_3 | int |
| Retry_4 | int |
| Retry_5 | int |
| Court_Status | varchar (50) |
| Note_3 | text |
| UserID | varchar (15) |
| Password | varchar (15) |
| Note_4 | text |
| Court_Logout_ID | int |
| Initial_Pause | int |
| Update_DT | datetime |
| NLS | char (10) |
| NLS_Status | char (10) |
| RIS_Office_ID | int |
| Searchable | smallint |
| TemporarilyDown | smallint |
| BillingCode | int |
| GuestSearchable | int |
| CRCV | int |
| Docket_Name | varchar (100) |
| Court_Shorthand | varchar (100) |
| OrderBy | smallint |

Labels: 571 → Court_ID; 572 → Court_Name; 575(a) → Note_1; 573 → Court_Login_ID; 575(b) → Note_2; 574(a) → Phone_1; 574(b) → Phone_2; 574(c) → Phone_3; 574(d) → Phone_4; 576(a) → Retry_1; 576(b) → Retry_2; 576(c) → Retry_3; 576(d) → Retry_4; 575(c) → Note_3

| Court_Login | |
|---|---|
| Column Name | Condensed Type |
| Court_Login_ID | int |
| Send_Char_1 | varchar (10) |
| LookFor_Char_1 | varchar (10) |
| LookFor_Line_1 | int |
| Send_Char_2 | varchar (10) |
| LookFor_Char_2 | varchar (10) |
| LookFor_Line_2 | int |
| Send_Char_3 | varchar (10) |
| LookFor_Char_3 | varchar (10) |
| LookFor_Line_3 | int |
| Send_Char_4 | varchar (10) |
| LookFor_Char_4 | varchar (10) |
| LookFor_Line_4 | int |
| Send_Char_5 | varchar (10) |
| LookFor_Char_5 | varchar (10) |
| LookFor_Line_5 | int |
| Send_Char_6 | varchar (10) |
| LookFor_Char_6 | varchar (10) |
| LookFor_Line_6 | int |
| Send_Char_7 | varchar (10) |
| LookFor_Char_7 | varchar (10) |
| LookFor_Line_7 | int |
| Send_Char_8 | varchar (10) |
| LookFor_Char_8 | varchar (10) |
| LookFor_Line_8 | int |
| Send_Char_9 | varchar (10) |
| LookFor_Char_9 | varchar (10) |
| LookFor_Line_9 | int |
| Send_Char_10 | varchar (10) |
| LookFor_Char_10 | varchar (10) |
| LookFor_Line_10 | int |
| Note_1 | text |
| Initial_Pause | int |
| Pause_1 | int |
| Pause_2 | int |
| Pause_3 | int |
| Pause_4 | int |
| Pause_5 | int |
| Pause_6 | int |
| Pause_7 | int |
| Pause_8 | int |
| Pause_9 | int |
| Pause_10 | int |
| Update_DT | dateline |

681 → Send_Char_1
682 → LookFor_Char_1
683 → LookFor_Line_1
684 → Update_DT

770 →

| Court_Search | |
|---|---|
| Column Name | Condensed Type |
| Court_Search_ID | int |
| Start_Note_1 | text |
| Stop_Note_1 | text |
| Sequence_Note_1 | text |
| Send_Char_1 | varchar (10) |
| LookFor_Char_1 | varchar (10) |
| LookFor_Line_1 | int |
| Send_Char_2 | varchar (10) |
| LookFor_Char_2 | varchar (10) |
| LookFor_Line_2 | int |
| Send_Char_3 | varchar (10) |
| LookFor_Char_3 | varchar (10) |
| LookFor_Line_3 | int |
| Send_Char_4 | varchar (10) |
| LookFor_Char_4 | varchar (10) |
| LookFor_Line_4 | int |
| Send_Char_5 | varchar (10) |
| LookFor_Char_5 | varchar (10) |
| LookFor_Line_5 | int |
| Send_Char_6 | varchar (10) |
| LookFor_Char_6 | varchar (10) |
| LookFor_Line_6 | int |
| Send_Char_7 | varchar (10) |
| LookFor_Char_7 | varchar (10) |
| LookFor_Line_7 | int |
| Send_Char_8 | varchar (10) |
| LookFor_Char_8 | varchar (10) |
| LookFor_Line_8 | int |
| Send_Char_9 | varchar (10) |
| LookFor_Char_9 | varchar (10) |
| LookFor_Line_9 | int |
| Send_Char_10 | varchar (10) |
| LookFor_Char_10 | varchar (10) |
| LookFor_Line_10 | int |
| Send_Char_11 | varchar (10) |
| LookFor_Char_11 | varchar (10) |
| LookFor_Line_11 | int |
| Send_Char_12 | varchar (10) |
| LookFor_Char_12 | varchar (10) |
| LookFor_Line_12 | int |
| Send_Char_13 | varchar (10) |
| LookFor_Char_13 | varchar (10) |
| LookFor_Char_13 | int |
| Send_Char_14 | varchar (10) |
| LookFor_Char_14 | varchar (10) |
| LookFor_Char_14 | int |
| Send_Char_15 | varchar (10) |
| LookFor_Char_15 | varchar (10) |
| LookFor_Line_15 | int |
| Note_1 | text |
| Pause_1 | int |
| Pause_2 | int |
| Pause_3 | int |
| Pause_4 | int |
| Pause_5 | int |
| Pause_6 | int |
| Pause_7 | int |
| Pause_8 | int |
| Pause_9 | int |
| Pause_10 | int |
| Pause_11 | int |
| Pause_12 | int |
| Pause_13 | int |
| Pause_14 | int |
| Pause_15 | int |
| Update_DT | datetime |

FIG. 12

| Result | |
|---|---|
| Column Name | Condensed Type |
| Result_ID | int |
| Search_ID | int |
| Master_Search_ID | int |
| CustomerID | int |
| DateTime | datetime |
| Search_Level | int |
| Search_Type | int |
| Result_Type | int |
| Result_1 | text |
| Result_2 | text |
| Result_3 | text |
| Result_4 | text |
| Result_5 | text |
| Result_6 | text |
| Court_ID | int |
| Court_Name | char (100) |
| Result_7 | varchar (50) |

| Court_Logout | |
|---|---|
| Column Name | Condensed Type |
| Court_Logout_ID | int |
| Initial_Pause | int |
| Send_Char_1 | varchar (10) |
| LookFor_Char_1 | varchar (10) |
| Pause_1 | int |
| Send_Char_2 | varchar (10) |
| LookFor_Char_2 | varchar (10) |
| Pause_2 | int |
| Send_Char_3 | varchar (10) |
| LookFor_Char_3 | varchar (10) |
| Pause_3 | int |
| Send_Char_4 | varchar (10) |
| LookFor_Char_4 | varchar (10) |
| Pause_4 | int |
| Send_Char_5 | varchar (10) |
| LookFor_Char_5 | varchar (10) |
| Pause_5 | int |
| Send_Char_6 | varchar (10) |
| LookFor_Char_6 | varchar (10) |
| Pause_6 | int |
| Send_Char_7 | varchar (10) |
| LookFor_Char_7 | varchar (10) |
| Pause_7 | int |
| Send_Char_8 | varchar (10) |
| LookFor_Char_8 | varchar (10) |
| Pause_8 | int |
| Send_Char_9 | varchar (10) |
| LookFor_Char_9 | varchar (10) |
| Pause_9 | int |
| Send_Char_10 | varchar (10) |
| LookFor_Char_10 | varchar (10) |
| Pause_10 | int |
| Note_1 | text |
| Update_DT | datetime |

*FIG. 16*

| | |
|---|---|
| | http://www.courtexpress.com/patron/home.cfm |

COURT EXPRESS

MEMBERS ONLY
- HOME
- SEARCH
- RESULTS
- DOCUMENTS
- SETUP
- EXIT

*1040* PENNSYLVANIA EASTERN DISTRICT

Searching for: KRAFT, DEBBIE | In: 08-Jun-99 02:37 PM | Out: 08-Jun-99 02:42 PM

| Case Number | In Re | Filed? |
|---|---|---|
| 296tv4744 *1050* | WILLIAMS V. FRASER, et al | 07/02/96 |

| Judge | Jury Demand | Demand Amount | Nature of Suit | Cause |
|---|---|---|---|---|
| Assigned to: JUDGE CLARENCE C. NEWCOMER | | $0,000 | 550 | variables 42:1983 Prisoner Civil Rights |

| Case Status | Load Docket | Jurisdiction | Other Court |
|---|---|---|---|
| CLOSED | None | Federal Question | None |

Names and Addresses

| Plaintiff/Litigant | Attorney(s) |
|---|---|
| JOHN BARRY WILLIAMS | JOHN BARRY WILLIAMS |
| PLAINTIFF | BI-4373 |
| | [COR-LD-NTC] [PROSE] |

□ US Court Document Retrieval CourtEXPRESS http://www.courtexpress.com/patron/home.cfm

COURT
EXPRESS

MEMBERS ONLY
• HOME
• SEARCH

Check Box Below to Select Docketed Item(s)

Click to Order Documents Now ←—— 1070

☑ 7/2/96    1    MOTION BY PLAINTIFF JOHN BARRY WILLIAMS TO PROCEED
                  IN FORMA PAUPERIS. (rb) [ENTRY DATE 07/03/96]

• RESULTS

☑ 7/2/96    —    Standard Case Management Track. (rb) [Entry date 07/03/96]
      ↑
     1080

8/14/96   2    ORDER THAT PETITION TO PROCEED IN FORMA PAUPERIS IS DENIED FOR
      ↑            LACK OF COMPLIANCE WITH THE FILING FEE REQUIREMENTS OF THE
     1090          PRISONER LITIGATION REFORM ACT OF 1995; ETC. (SIGNED BY JUDGE
• DOCUMENTS          DANIEL H. HUYETT 3rd) 8/14/96 ENTERED AND COPIES MAILED. (jer)

• SETUP

☑ 8/14/96   —    Case closed (ddd) [Entry date 08/15/96]

☑ 8/26/96   3    Plaintiff has returned an application to proceed in forma pauperis
                  along with a partial account listing. (Also see 96-4745) (gm)
                  [ENTRY DATE 08/27/96]

9/20/96   4    MEMORANDUM AND ORDER THAT PLFF, AN INMATE, IS SEEKING TO

• EXIT

METHOD, SYSTEM AND COMPUTER-READABLE MEDIUM FOR ACCESSING AND RETRIEVING COURT RECORDS, ITEMS AND DOCUMENTS

This application claims the benefit of U.S. Provisional Patent Application Ser. No. 60/165,730 filed on Nov. 15, 1999, which is herein incorporated by reference.

FIELD OF THE INVENTION

This invention relates generally to a method, system and computer-readable medium for database accessing and processing and, more particularly, to accessing court databases and processing the search results.

BACKGROUND OF THE INVENTION

Often, individuals would like to have access to records and documents that are kept at sometimes-distant data repositories. In some circumstances, such records and documents are desired as soon as available. In others, the records or documents are desired on a regular, scheduled basis to provide updates, for example. Attorneys, for example, frequently obtain various records and associated documents from courts and study them for one reason or another. For instance, the attorney may wish to monitor the progress of an important case or they may want to obtain legal briefs that were filed in a case involving similar legal issues the attorney is currently confronted with.

The records and documents that attorneys may wish to see are often collected and/or produced by courts on a daily basis. As a court case progresses through its life cycle, important dates, corresponding events and associated documents are recorded and stored. It is important that these items are recorded and stored so that court officials, attorneys and members of the public can access them to review or learn about a case. However, at any given time a court may have hundreds, if not thousands of cases pending before it. Indeed, manually keeping track of all the dates and events let alone other information related to each of the cases is unfathomable.

As a result, many Federal and State courts, and some local courts, for example, employ computer docketing systems to handle such record keeping. In a court environment, for example, court clerks enter important dates, events and other information for each case in the court's computer docketing system. Moreover, each court case has associated therewith a docket sheet including all of the information entered into the system for the case, which is typically stored in a court database. It should be noted that court case docket sheets and the particular documents identified therein are generally available to the public, though not always. In addition, some courts having computer docketing systems offer access into their court database for retrieving court case records, such as court case docket sheets, using a modem dial-up connection, for example.

Heretofore it has been difficult for individuals to conveniently access court case records and retrieve the items or documents associated therewith. Individuals have been able to access some electronic court case records. For example, the PACER™ records retrieval service allows individuals to access Federal Court electronic court case records. However, once the electronic court case records are accessed, a cumbersome process ensues for actually retrieving the items or documents identified in the court case records. In particular, a document retrieval service is contacted to identify, purchase and request delivery of the items or documents identified in the court case records.

For example, attorneys, paralegals, law clerks or law librarians who have had to access Federal Court records and retrieve documents in the nature of a specific docket sheet and corresponding items enumerated therein (e.g., complaints, pleadings or memoranda of law), are well aware of the series of inefficient, time-consuming steps involved in accomplishing the task. Many legal researchers are familiar with the process of logging-on to the PACER™ Federal Court records access service, conducting a court docket sheet search for a particular case they are interested in, printing the relevant docket sheet once found, and then communicating the information to the requester. The requester will then pour over the docket sheet to determine which of the identified court items or documents (e.g., pleadings, scheduling orders, etc.) are needed.

The next step in this process often involves contacting a local or regional document retrieval service to request the full-text version of the specific court case items or documents available through their service. In order to ensure accuracy regarding the request, an additional step in the process involves faxing the document retrieval service the docket sheet clearly indicating the required items. As a follow-up, a telephone call is sometimes placed to the document retrieval service to confirm that they have indeed received the request, or sometimes to provide them with additional instructions.

Perhaps one of several reasons it has been difficult to provide individuals with the ability to conveniently access electronic court case records is that court databases are not always accessible through the same communication medium. For example, some court databases may be accessible only through dial-up connections while others, alternatively or in addition, may be accessible through the Internet. Moreover, retrieving items or documents associated with electronic court case records can be even more difficult. Electronic court case records may not always include markers that identify the location of the court items or documents within the records. Making matters worse, electronic court case records accessed from different court databases are not always stored in the same format. Moreover, since human beings input the electronic court case records, data inconsistencies are common even within a single electronic court case record. Thus, such indiscriminate court items or documents contained in the electronic court case records can be difficult to identify.

SUMMARY OF THE INVENTION

A method for accessing and retrieving court records, items and documents, in accordance with one embodiment of the present invention, includes retrieving the electronic records from storage locations, parsing the electronic records to convert indiscriminate data sets into user-selectable objects and causing the user-selectable objects to be displayed.

A system for accessing and retrieving court records, items and documents, in accordance with another embodiment of the present invention, includes stations operatively connected to storage locations that store electronic records. In addition, processors interact with the stations to retrieve the electronic records from the storage locations, parse the electronic records to convert indiscriminate data sets into user-selectable objects and cause the user-selectable objects to be displayed.

A computer-readable medium tangibly embodying a program of machine executable instructions for accessing and retrieving court records, items and documents to perform a method in accordance with another embodiment of the present invention includes retrieving the electronic records from storage locations, parsing the electronic records to convert indiscriminate data sets into user-selectable objects and causing the user-selectable objects to be displayed.

At least one of a number of advantages of the present invention includes users being able to simultaneously search and access a number of different court databases, regardless of whether the court databases are accessible through a dial-up connection or through another network connection, such as the Internet. Another one of the advantages includes users being able to request a number of court database searches while still being able to perform other tasks as the search requests are executed. Yet another one of the advantages of the present invention includes selectively executing search requests based on a number of factors. In addition, users can conveniently access, view and request retrieving, purchasing or delivery of court case records and the items or documents contained within them.

BRIEF DESCRIPTION OF THE DRAWINGS

The present invention will become more fully understood from the detailed description given hereunder and the accompanying drawings which are given by way of illustration only, and thus are not limitative of the present invention, and wherein:

FIG. 2 shows an exemplary database utilized to store user account data, in accordance with another embodiment of the present invention;

FIG. 6 shows an exemplary database utilized to store court database search request criteria, in accordance with another embodiment of the present invention;

FIG. 8 shows an exemplary database utilized to store court database data, in accordance with another embodiment of the present invention;

FIG. 10 shows an exemplary database utilized to store court database log-in parameters, in accordance with another embodiment of the present invention;

FIG. 12 shows an exemplary database utilized to store court database search procedure parameters, in accordance with another embodiment of the present invention;

FIG. 14 shows an exemplary database utilized to store search results of court database searches, in accordance with another embodiment of the present invention;

FIG. 16 shows an exemplary database utilized to store court database log-out parameters, in accordance with various other embodiments of the present invention;

FIG. 18 is an exemplary screen print of another Web page showing the court records for a particular case obtained from executing a court database search, in accordance with another embodiment of the present invention;

FIG. 19 is an exemplary screen print of another portion of the Web page illustrated FIG. 18, showing selectable, individual court items or documents associated with the court records; and FIG. 20 is an exemplary screen print of another Web page showing the various types and results of recent user court database search requests, in accordance with another embodiment of the present invention.

DETAILED DESCRIPTION OF THE INVENTION

Figure 1:
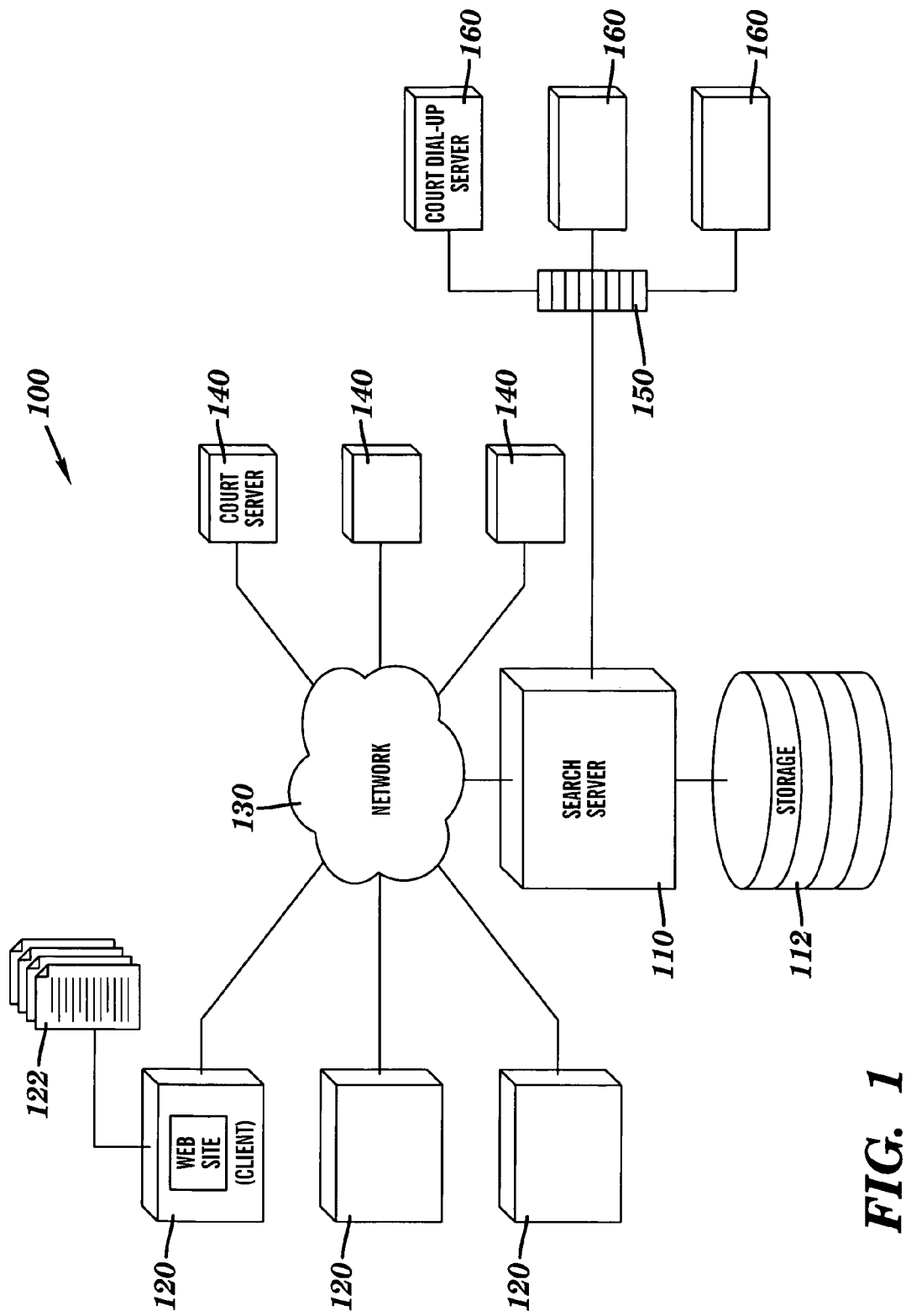
FIG. 1 is a block diagram illustrating a system for accessing and retrieving court records, items and documents, in accordance with one embodiment of the present invention.
Figure 4:
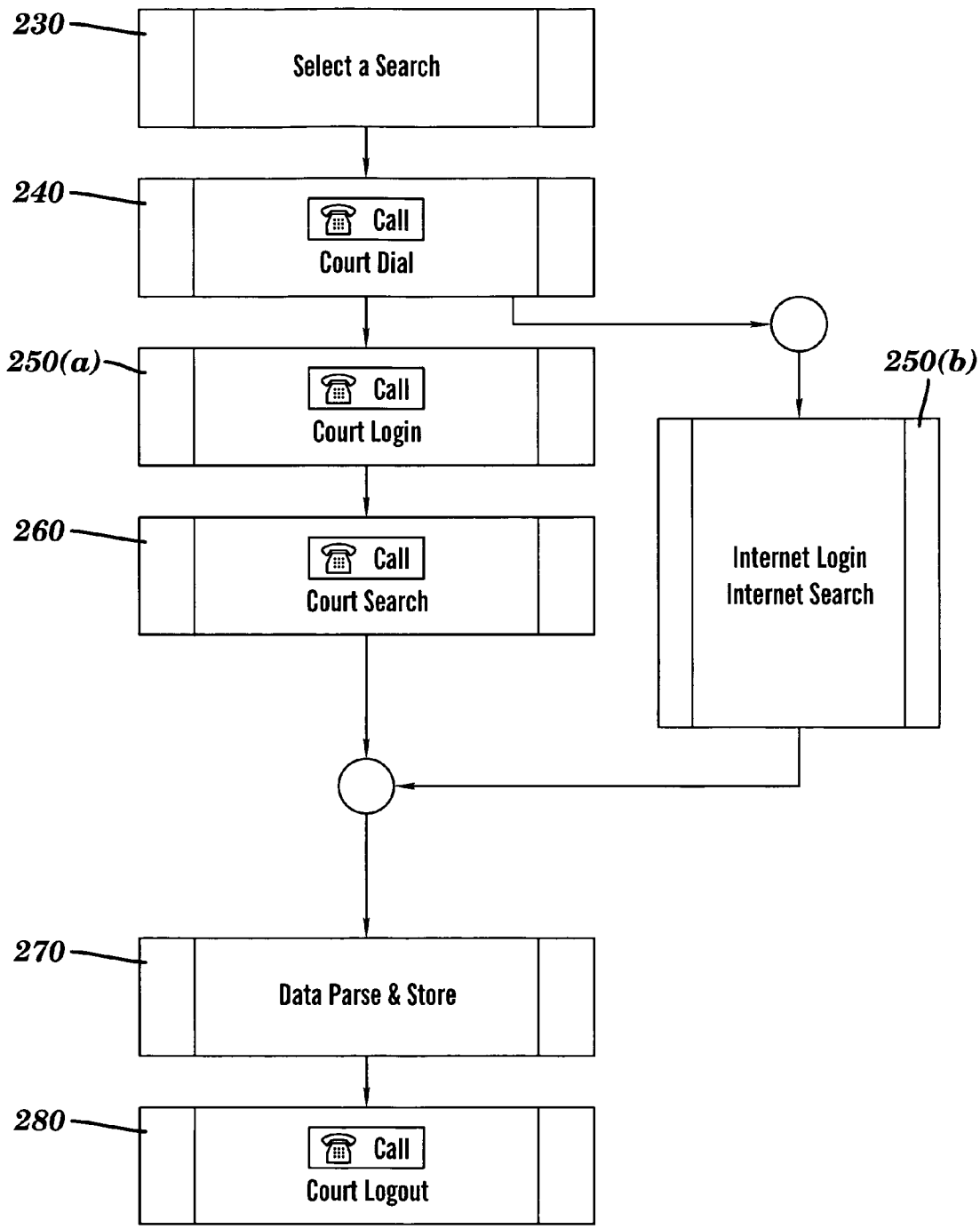
FIG. 4 is a flow chart of a method for executing searches of court databases accessible through the Internet or dial-up connections, in accordance with another embodiment of the present invention.

A system, method and computer-readable medium for accessing and retrieving court records, items and documents, in accordance with one aspect of the present invention, is illustrated in FIGS. 1 and 4. The method and the programmed computer readable medium include retrieving the electronic records from storage locations, parsing the electronic records to convert indiscriminate data sets into user-selectable objects and causing the user-selectable objects to be displayed. The system includes stations operatively connected to storage locations that store the electronic records. Additionally, processors interact with the stations to retrieve the electronic records from the storage locations, parse the electronic records to convert indiscriminate data sets into user-selectable objects and cause the user-selectable objects to be displayed. The present invention includes a number of advantages, such as providing simultaneous searching of a number of different court databases accessible through dial-up connections or other networks, enabling other tasks to be performed while search requests are executed, avoiding wasting system resources by selectively executing search requests and providing convenient viewing, accessing, retrieval, purchasing and delivery of court case records and items or documents contained within them.

Referring now to FIG. 1, system 100 includes search server 110 including storage 112, and operatively connected to client computers 120 and court servers 140 via network 130 to allow search server 110, client computers 120 and court servers 140 to communicate with each other. Further, search server 110 is operatively connected to court dial-up servers 160 via modem bank 150 to allow search server 110 and court dial-up servers 160 to communicate with each other.

In this particular embodiment, search server 110 is programmed with the method for accessing and retrieving court records, items and documents in accordance with the present invention and which is described in at least one embodiment herein. Search server 110 is coupled to network 130 of users, which are a plurality of client computers 120, although other types of systems could be used.

Additionally, although one search server 110 is shown in this particular example, other types of small and large computer systems could be used in place of the search server 110. Since the components and general operation of computer systems, such as servers and clients, are well known to those of ordinary skill in the art, they will not be discussed in detail here.

Client computers 120 can be personal desktop computers, workstations, palm top computers, Internet ready cellular/digital mobile telephones, dumb terminals or any other larger or smaller computer system, for example. Client computers 120 may utilize many different types of platforms and operating systems, including, for example, Linux™, Windows™, Windows CE™, Macintosh™, Unix™, SunOS™, and variations of each. Also, while client computers 120 have varying processing capabilities in this and other embodiments, the only requirement is that they are capable of establishing and maintaining data connections with other computers or networks (e.g., Internet). Moreover, although client computers 120 are shown separate from search server 110, it should be understood that a single computer could perform the client and server functions.

Further, each client computer 120 typically includes one or more processors, one or more memory storage, one or more input/output devices including communication devices such as modems (not illustrated), for example. In this particular embodiment, client computers 120 can load Web pages 122 retrieved from a computer readable medium, for example, which can be situated in a computer system of client computers 120 or search server 110, discussed in greater detail further below. In this particular embodiment, the Web pages can be data records including as content plain textual information or graphics. In addition, client computers include display devices for displaying Web pages 122 through a conventional Web browser program. In this particular embodiment, the display devices comprise conventional color computer monitors. However, monochrome, grayscale or a number of other different types of display devices are used in other embodiments. Also, the Web browser programs utilized by client computers 120 for displaying Web pages 122 include Netscape Navigator™, Microsoft Explorer™ or Mosaic™ to locate the Web pages in this and other embodiments. Still further, Web pages 122 are associated with a court database search Web site in accordance with the present invention.

Search server 110 can be similarly configured. In this particular embodiment, search server 110 includes a processor (not illustrated), such as a central processing unit or other processing logic device. Moreover, search server 110 can have multiple processors as needed or desired. The processors execute the instructions for the method for accessing and retrieving court records, items and documents, as well as, other instructions for other types of applications, such as, a word processing application, etc., that may be run by the search server 110. In one particular embodiment of the present invention, search server 110 comprises storage 112, client computer 120, court servers 140 and court dial-up servers 160. In another embodiment, search server 110, storage 112, client computer 120, court servers 140 and court dial-up servers 160 are situated in the same physical location.

In other embodiments, search server 110 comprises many computers, perhaps connected by a separate private network, such as a LAN. Additionally, search server 110 includes communication devices (not illustrated) that allow users at client computers 120 to access search server 110 through network 130. Many devices can be used, such as one or more modems as in modem bank 150. In addition or alternatively, any communication device that can receive and process wireless data signals received from client computers 120 can be used as well. Also, search server 110 is operatively connected to one or more processors (not illustrated) for executing the steps and accessing data utilized by the present invention. The processors are situated within search server 110 in this particular embodiment, but are situated in remote locations from search server 110 in other embodiments. Furthermore, search servers 110 can access each other through network 130 to access storage 112 or modem bank 150, for example.

In this particular embodiment, storage 112 is operatively connected to search server 110 and comprises a computer readable medium where system 100 stores the steps and data utilized by the present invention. Although in this particular embodiment one storage 112 is shown, the search server 110 can have multiple memories as needed or desired. Also, storage 112 is situated within search server 110 in this particular embodiment, but is situated in a remote location from search server 110 in other embodiments. Storage 112 may be any type of storage device, such as a random access memory (RAM) or a read only memory (ROM), or other type of magnetic or optical reading and/or writing drive system that is connected to search server 110 and which can receive, read data from and/or write data to a computer readable medium.

It should be noted that in other embodiments, storage 112 comprising a computer readable medium can be a portable memory device that is used on the client side rather than the server side. Examples of such computer readable mediums, whether used on the client side or the server side, in accordance with one embodiment of the present invention, include floppy disks, hard disks, ZIP™ disks, CD-ROM's, DVD's, computer readable cassette tapes or reels, or punch cards, for example. Further, the instructions for the method of accessing and retrieving court records, items and documents in accordance with the present invention are stored in storage 112, which again may comprise a computer readable medium.

Further, network 130 can include hundreds of thousands of individual networks of computers. Client computers 120 can access network 130 in a variety of ways, including through a conventional TCP/IP, xDSL, ISDN, cable or dial-up modem connection, for example. It should be noted that a variety of different communication systems and/or methods can be used to connect search server 110 to each of the users at client computers 120 in network 130, such as a local area network, a wide area network, modems and phone lines, wireless communication technology or information stored in a single computer using other communications protocols, etc. Since the operation of these communication systems are well known to those of ordinary skill in the art they will not be discussed here.

In should be appreciated that network 130 comprises a variety of network configurations, including a LAN or a WAN, for example. In addition, storage 112 comprises a variety of storage devices, including local and networked storage devices, depending on the particular network configuration used.

Referring generally to FIGS. 2-17, the basic operation of accessing search server 110 stored in storage 112 for requesting court database searches in accordance with practicing the present invention will now be discussed. First, users of client computers 120 wanting to search court databases for electronic court case records (i.e., electronic court case docket sheets) and perhaps purchase court items (i.e., court documents) noted in the electronic court case records access the Web pages stored in search server 110 at storage 112, in this particular embodiment. This is accomplished by the user inputting a Universal Resource Locator ("URL"), such as www.courtexpress.com, associated with the court database search Web site stored in search server 110 at storage 112, which is herein incorporated by reference. The user can input the URL into the appropriate data input field in a Web browser program running on client computer 120, which directs the Web browser program running on client computer 120 to retrieve and load Web pages 122 stored at search server 110 that comprise the court database search Web site. In other embodiments, the URL associated with search server 110 is stored in a memory of client computer 120, or it is stored in storage 112 comprising a computer readable medium used on the client side where storage 112 includes an application for accessing search server 110.

If it is a user's first time accessing search server 110, they must complete an account sign-up process. During the account sign-up process, search server 110 gathers information about the user and stores the information in one or more databases in storage 112.

Referring more specifically to FIG. 2, the user information is stored in storage 112 in USERID database 170, in accordance with this particular embodiment of the present invention. First, the user must create a unique user log-in ID and password. Thereafter, users must enter their unique user log-in ID and password to gain access to search server 110. Once users log-in for the first time, they are presented with various options, such as selecting auto-login to avoid the necessity of entering their user login ID and password each time they access search server 110, for example.

Users are also presented with several billing options to choose from, including monthly billing or a 'pay-as-you-go' billing option using a credit card. In this particular embodiment, users are charged only when they actually receive court database search results. If a user's court database search is not successfully completed, they will not be charged. Also in this particular embodiment, accounts are assessed a yearly administrative fee. Moreover, charges for court document retrieval are levied on a per case basis.

Furthermore, accounts are limited to the number of users at each entity (e.g., by address) seeking an account, for example. In addition, users can designate an account administrator for their particular entity. This is a security feature whereby the entity's account administrator is contacted when a search request is sent from an unauthorized user. The administrator may then validate the user for current and future court database searches.

In this particular embodiment, the user can select the various options by checking a graphic check-box, radial interface or other types of interfaces (not illustrated) on Web page 122 displayed on the display device of client computer 120. Moreover, the user can use conventional hand-held pointer devices such as mice, light pens or track-ball devices, for example.

Conducting Searches

Figure 3:
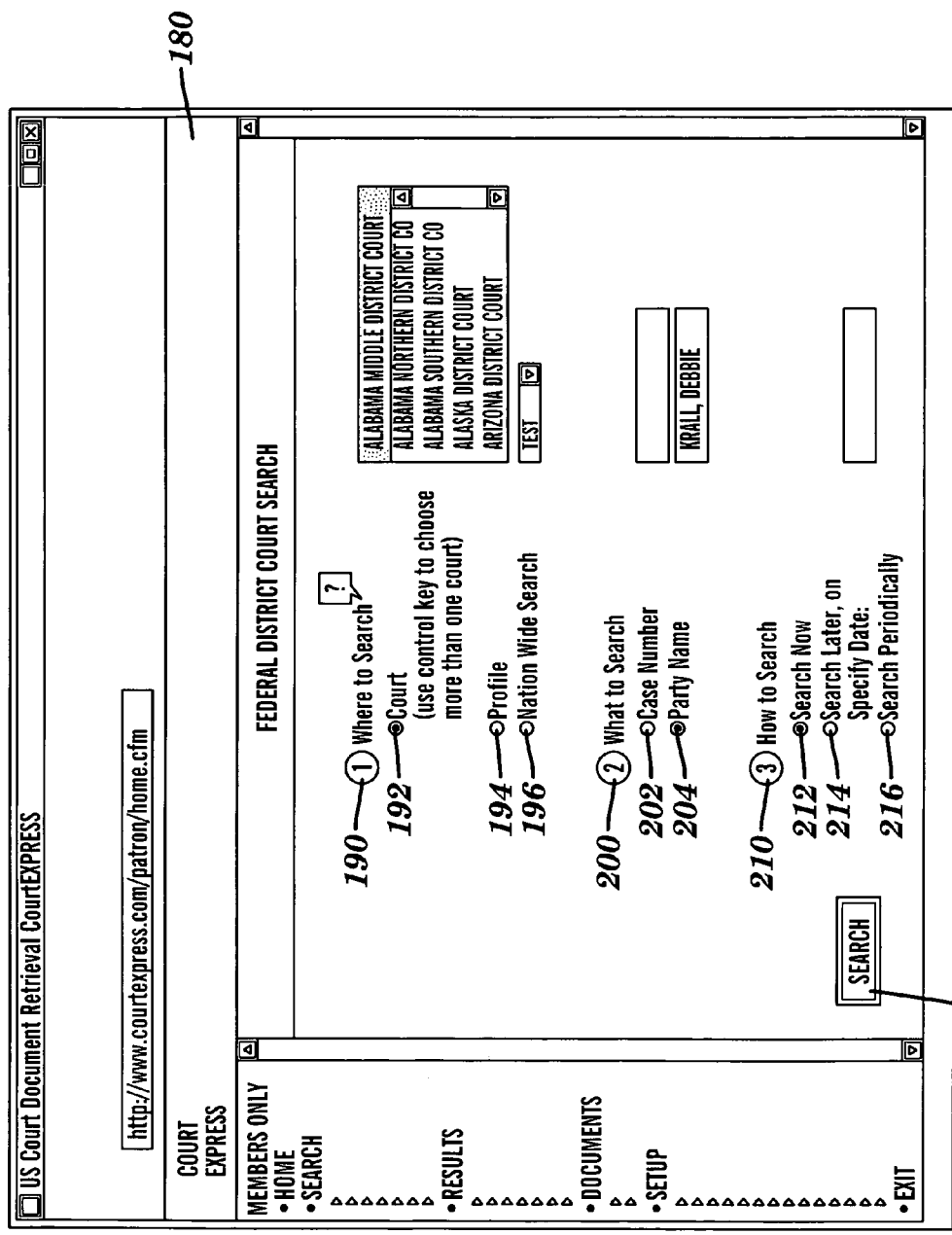
FIG. 3 is an exemplary screen print of a Web page for allowing users to input court case search criteria, in accordance with another embodiment of the present invention.

Referring more specifically to FIG. 3, an exemplary screen print showing one of the Web pages 122 displayed by client computers 120 providing a search interface 180 allowing users to input court database search criteria in accordance with another embodiment of the present invention is described herein. In this particular embodiment, users input a number of search criteria, such as where 190, what 200 and when 210 to search, in accordance with this particular embodiment. Search interface 180 provides users with the ability to search the computerized docketing systems of the Federal District Courts, U.S. Courts of Appeals, Bankruptcy Courts, National Locator Service, State Courts and Local Courts, for example.

In this particular embodiment, users can enter a number of search criteria 190-216, including the court databases to search 192, a previously stored profile of a user selected group of court databases 194, a nation wide search of all the court databases available for searching (i.e., court databases accessible through a dial-up or Internet connection) 196, a docket or case number to search for 202, a party name to search for 204, a client reference number (not illustrated), whether to execute the search immediately 212, or whether to execute the search at a later, specified date 214 or to perform the search periodically 216, for example.

In another embodiment, users can enter subject specific search criteria (not illustrated) to search court databases for electronic court docket sheets. For example, such a search could be constructed to search for lawsuits as they are filed in Federal Court that are related to an attorney's particular area of expertise. As an example, on a daily basis, such a search request could be executed by search server 110 so as to scan the Federal District Courts for recently filed cases pertaining to "Asbestos Personal Injury Product Liability." In other embodiments, litigants and attorneys, for example, can be searched for, allowing users to monitor what is happening with potential clients as well as opponent law firms, for example. These features could assist professionals, for example, in generating new business, by conveniently providing them with the most current information available.

Once a user has entered all of their desired search criteria, the user requests search server 110 to execute the search request by clicking on search button 220, for example. The search request and associated search criteria are sent from client computer 120 via network 130 to search server 110 for storage in SEARCH database 410 (FIG. 6) in storage 112. It should be noted that many users may be concurrently submitting search requests to search server 110. Each user search request is stored as described above, and thus queued in SEARCH database 410 to be selected for later execution by search server 110 in accordance with another embodiment of the present invention, will be discussed in detail further below.

In accordance with another embodiment of the present invention, once user search requests are selected by search server 110 for execution, as will be described later, the court database search is executed through one or more court databases associated with search criteria 192-216, the court databases located at court servers 140 or court dial-up servers 160 (e.g., the PACER™ Federal Court records retrieval service database). as explained above. In addition, users may submit additional court database search requests.

It should also be noted that once search requests are submitted to search server 110, users are not required to await execution of their search requests. Users may then go about performing other tasks on the Internet or in their desktop applications running on client computers 120, they may continue to submit additional search requests to search server 110 in the same or different court databases, run other Internet applications, log-off search server 110, etc.

In another embodiment, court database searches requests can be set up to recur and automatically be executed by search server 110 on a regular basis (e.g., daily, weekly, monthly, etc.). This type of recurring search feature of search server 110 allows users to monitor dockets on a daily, weekly or monthly basis. A recurring search can be set up to run during the late hours of the night and be ready for retrieval when the user arrives at work the next morning. For example, search server 110 can execute a recurring search twice a day, thereby ensuring both comprehensive coverage and that the most important court dockets are being monitored.

Each search request, which includes search criteria 190-216, user account information stored in USERID database 170 and other pertinent data are stored in SEARCH database 410 (FIG. 6) in storage 112. It should be noted that the databases utilized in this particular embodiment, as well as in some of the other embodiments of the present invention, utilize conventional data structures for creating the databases. Conventional data structures including stacks, queues, linked lists, or any other arrangement a skilled artisan might choose to utilize can be employed without significantly affecting system performance of search server 110. In addition, the databases comprise conventional relational databases for organizing the data in this particular embodiment of the present invention.

As mentioned earlier, users may specify one or more court databases to be included in search criteria 190-216. In addition, the one or more court databases included in the court search criteria can be court databases located at court servers 140 or court databases located at court dial-up servers 160. Thus, in the case where the search criteria includes more than one court database to be searched, it should be understood that this description of the method contemplates dealing with one court database to be searched at a time for clarity of explanation. However, it should be understood that many searches of many different court databases can be executed concurrently in this and other embodiments of the present invention.

Referring more specifically to FIG. 4, the basic operation of the present invention for accessing and retrieving court records, items and documents located at court databases that are accessible through an Internet or dial-up connection will be described. First, the method begins with search server 110 selecting a search request from SEARCH database 410 (FIG. 6) to execute in step 230. Once a search request has been selected, search server 110 executes step 240, which includes attempting to access the court databases specified in search criteria 190-216 located in court servers 140 or court dial-up servers 160.

If the court databases are located at court dial-up servers 160, then search server 110 executes step 250(*a*) and establishes a data connection (i.e., logs-in) to court dial-up server 160 using modem banks 150 to access the court databases. Otherwise, search server 110 executes step 250(*b*) and establishes a data connection through network 130 to court servers 140 to access the court database. Next, the requested court database search is executed by search server 110 in step 260. In step 270, once the requested searches are executed, the search results are processed by search server 110 utilizing various data processing steps, and the data processed executed search results are stored in RESULT database 840 (FIG. 14) in storage 112 in search server 110. Then, if the court databases were located at court dial-up servers 160, and search server 110 is still logged-in to court dial-up server 160, after the user's last search has been executed, search server 110 terminates the data connection (i.e., logs-out) of court dial-up server 160, as shown in step 280.

Referring more specifically to FIGS. 5, 7, 9, 11, 13, 15 and 17, a more detailed discussion of a method for accessing and retrieving court records, items and documents, in accordance with one embodiment of the present invention, will now be discussed. Although one embodiment is described, it would be readily apparent to one of ordinary skill in the art that the present invention can be utilized in a variety of different applications.

Select a Search

Referring generally to FIGS. 1-3, 5-9, 11, 13 and 15, a process for selecting search requests to execute next, according to another embodiment of the present invention, is described herein. At predetermined time increments or dynamically, search server 110 selects search requests, entered by users through search interface 180, from SEARCH database 410 for executing. In determining which search requests to select for executing, search server 110 analyzes a number of factors, described in detail further down below. Once search server 110 selects the next search requests to execute based on these factors, the court databases specified in the search criteria associated with the search requests are accessed, as set forth in further detail below.

In this particular embodiment, search server 110 refers to the values stored in the data fields in any of the databases shown in FIGS. 2, 6 and 8, for example, to make decisions throughout execution. However, any of the databases mentioned herein may be utilized as necessary.

Figure 5:
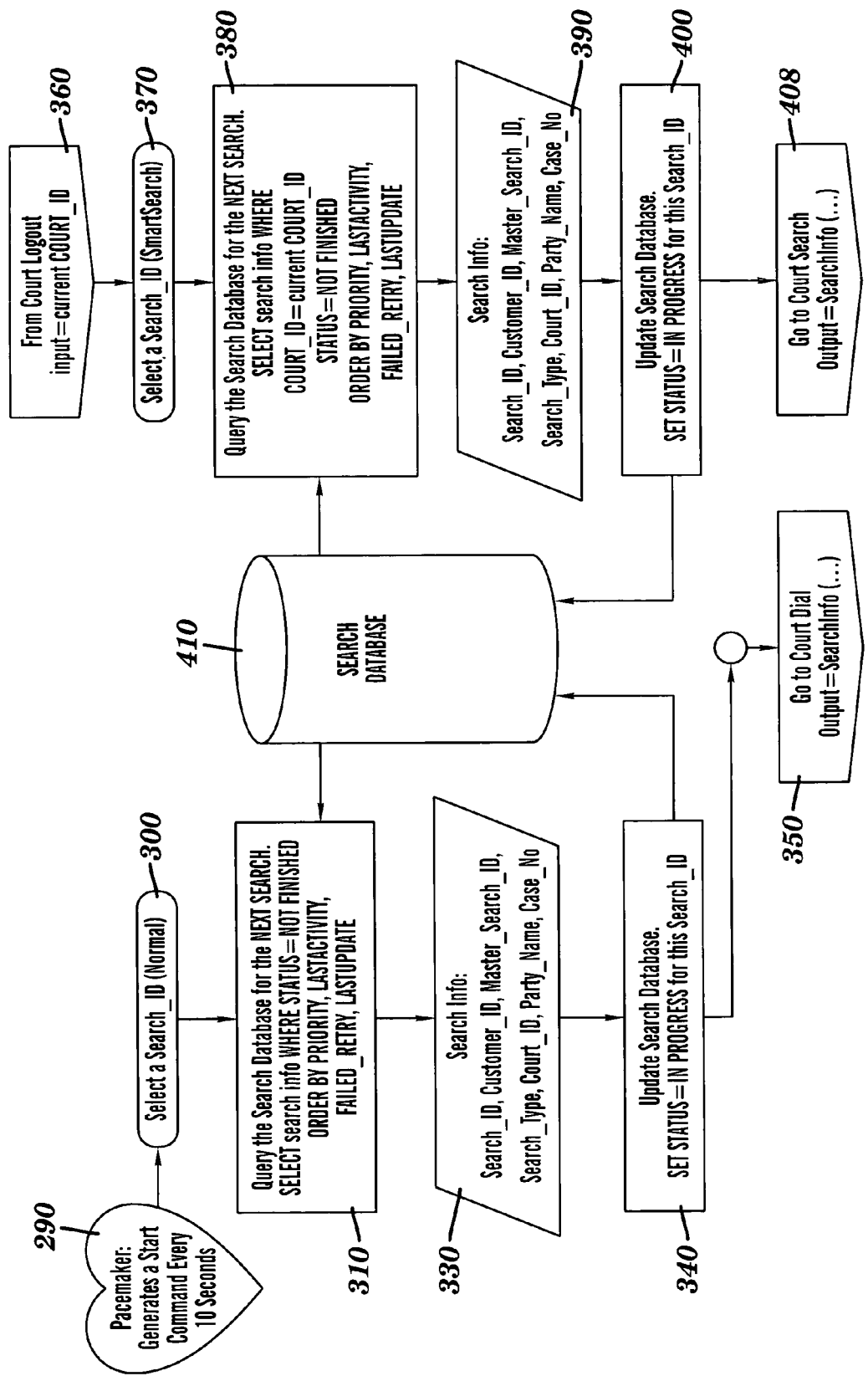
FIG. 5 is a flow chart of a process for selecting which queued court search request to execute, in accordance with another embodiment of the present invention.

Referring more specifically to FIGS. 5 and 6, in step 290, a pacemaker methodology triggers search server 110 several times a minute to query SEARCH database 410, in accordance with one embodiment of the present invention. In this particular embodiment, the pacemaker methodology triggers the query every ten seconds. However, it should be understood that the amount of time elapsing between triggering queries can be varied (e.g., 1, 1.5, . . . , 20 seconds/minutes). Further, the particular amount of time can be selected based on system resources, system performance, network traffic, the amount of data records stored in SEARCH database 410 or the number of users of search server 110, for example.

In another embodiment of the present invention, search server 110 monitors a number of factors, such as system resources, network traffic and system performance, for example, to dynamically select the amount of time elapsing in between queries, thus modifying the amount of time based on upon at least one of the foregoing factors. In addition, a number of methodologies for polling or generating interrupts can be used to cause search server 110 to query SEARCH database 410 at such time intervals.

In another embodiment of the present invention, the pacemaker methodology (step 290) described above with respect to at least one of the embodiments of the present invention is not used. In this particular embodiment of the present invention, rather than automatically triggering search server 110 to query SEARCH database 410 at predetermined time intervals, search server 110 utilizes an aware methodology to detect when search requests are submitted. Thus, search server 110 detects search requests as they are submitted by users and queued in SEARCH database 410. In another embodiment, search server 110 also detects search requests that have already been queued in SEARCH database 410. In yet other embodiments, search server 110 can employ either methodology (i.e., pacemaker or aware methodologies), where administrators of search server 110 can configure it to select a methodology to utilize according to a number of factors, including the rate at which search requests are being submitted, the quantity of queued or pending search requests stored in SEARCH database 410, system resources, network traffic and system performance, for example.

At step 300, search server 110 begins a method of selecting a search request to execute next by first querying SEARCH database 410 to obtain the next available search request record at step 310. In this particular embodiment, querying SEARCH database 410 for the next available search request record comprises identifying an index that references one of the search request records. Moreover, in one particular embodiment, the index references the first record stored in the database (i.e., a stacked data structure). Alternatively, the index references the last record in the database (i.e., a queued data structure). However, it should be understood that many different methods can be employed for selecting one of the search request records from SEARCH database 410.

Whichever method is employed, once the index is identified, selected data fields of the search request record referenced by the index are retrieved from SEARCH database 410 and stored in a temporary memory storage (i.e., buffer). A number of search criteria are stored in SEARCH database 410, including user information, CustomerID 411, court database information, Court_ID 413, and the search terms, Party_Name 414, for example. Once the selected data fields of the referenced search request record have been obtained from SEARCH database 410, search server 110 determines whether the search request should be executed next based on a number of factors expressed as the values contained in the selected data fields.

Referring more particularly to step 310, search server 110 analyzes the values of the various data fields within the search request record, in accordance with this particular embodiment of the present invention. Once a search request record is selected and passes the initial test, search server 110 analyzes a number of other data fields in the search request record obtained from SEARCH database 410. Any number and combination of data fields can be considered. A variety of factors can be used to determine which search request is selected next for executing, such as how many times the search request has failed, how old the search request is, how busy the particular court database specified in the search criteria is, how many phone lines are available to access the particular court database in the case of a dial-up court database.

However, in this particular embodiment, four data fields are considered, including the search request's status, Status 415, the last time there was any activity associated with the search request, LastActivity 416, how many retries have occurred, Failed_Retry 417 and the last time the search request was updated, LastUpdate 418.

Furthermore, search server 110 administrators can select which of the data fields should be considered in selecting the next search request to execute. If search server 110 analyzes each of the values stored in the selected data fields in the search request record, and determines that the values have satisfied a predetermined criteria or threshold, individually or in combination, then the search request will be selected for executing. In another embodiment of the present invention, search server 110 administrators can also associate the selected data fields with weighting values to indicate their respective degree of importance during the execution of the search request selecting. In this particular embodiment, search server 110 will factor the particular weighting values associated with each data field in analyzing each of the values stored in the data fields. For example, search server 110 can place greater emphasis on a selected data field associated with a particular weighting factor when analyzing each of the selected data fields, where the weighting factor indicates deference should be afforded to the data field.

In accordance with another embodiment of the present invention, the particular factor or factors (i.e., data fields within the search request record obtained from SEARCH database 410 at step 310) search server 110 analyzes for determining which search request to select next can be modified by search server 110 dynamically. The factors include client computer 120 priority, client computer 120 quality, search request priority, search request quality, the number of times the search request has already been attempted, when the search request was submitted, the particular courts to be searched associated with the search request, the cost of searching the courts, whether the courts to be searched are accessible through network 130 or through a dial-up connection using modem bank 150, the particular time of day the search request is being considered for selection by search server 110, the number of failed search requests for the particular court associated with the search request, the number of recently failed search requests for the particular court associated with the search request, the number of search requests queued in SEARCH database 410, the number of executed searches that have already been executed for the court associated with the search request, and the number of executed searches that have already been executed for the particular user or a court identifier, for example.

In another embodiment of the present invention, Artificial Intelligence ("AI") is utilized for analyzing the selected data fields of the search request record. In addition, the selected data fields may be assigned weighting values as described above. Selected data fields are analyzed in much the same way as described above, however, employing at least one AI methodology for analyzing the values of the selected data fields in view of their assigned weighting values in selecting the next search request to execute.

In addition, failed search requests are given less precedence than other search requests stored or soon-to-be stored in search SEARCH database 410 by modifying at least one of the selected data fields in the search request record. Specifically, the search request record's data field representing the search request's current priority, Priority 412, is modified to reflect its lower precedence. For example, the lower the priority value stored in the data field, Priority 412, the lower its precedence. Moreover, if a search request fails repeatedly, search server 110 automatically notifies its administrators.

In step 330, once search server 110 selects the next search request to execute, the search criteria associated with the search request is retrieved from SEARCH database 410 and stored in a memory (i.e., buffer), for example. Then, in step 340, the search request's status data field, Status 415, of the selected search request record stored in search database 320 is updated to indicate that it is being executed (i.e., the search request is in progress). A number of values may represent the different statuses of the search request records stored in SEARCH database 410. For example, the value 999 stored in the status data field, Status 415, is arbitrarily chosen to represent that a search request is being executed. Lastly, in step 350, search server 110 attempts to access the particular court databases associated with search criteria 192-216, discussed in detail further below.

In another embodiment of the present invention, once search server 110 has completed executing a search request of a particular court database located at court dial-up server 160 in accordance with FIG. 5, 7, 9, 11, 13 or 15 and the corresponding descriptions further below, dial-up court log-out step 880 (FIG. 15) causes search server 110 to begin, at steps 360 and 370, determining whether the court associated with the executed search has any additional, queued search requests for it in SEARCH database 410.

At step 380, search server 110 determines whether the court associated with the executed search has any additional, queued search requests for it by querying SEARCH database 410 to obtain the next available search request record. It should be noted that steps 390 and 400 are similar to steps 300-340 described above in detail, and thus the various alternatives and details set forth above are applicable in this particular embodiment as well and thus will not be repeated. At step 408, since search server 110 most likely still has a data connection established with a court database located at court dial-up server 160, search server 110 executes the selected search request by performing a dial-up court database search as set forth in FIG. 11 and corresponding description. However, if the data connection was terminated, search server 110 would execute the court database dial, dial-up court database log-in and dial-up court database search methodologies in accordance with FIGS. 7, 9 and 11 and corresponding description.

In another embodiment in accordance with the present invention, search server 110 determines whether the user who submitted the search request has any additional search requests to execute in the same court database as the executed search by first querying SEARCH database 410 to obtain the next available search request record at step 380. It should be noted that steps 390 and 400 are also similar to steps 300-340 described above in detail, and thus the various alternatives and details set forth above are applicable in this particular embodiment as well and thus also will not be repeated. At step 408, since search server 110 most likely still has a data connection established with a court database located at court dial-up server 160, search server 110 executes the selected search request by performing a dial-up court database search as set forth in FIG. 11 and corresponding description. However, if the data connection was terminated, search server 110 would execute the court database dial, dial-up court database log-in and dial-up court database search methodologies in accordance with FIGS. 7, 9 and 11 and corresponding description.

Court Database Dial

Referring to generally FIGS. 2 and 6-8, a process for accessing court databases located on court dial-up servers 160 in accordance with another embodiment of the present invention is described herein. The particular court databases to be searched are retrieved from memory. COURT database 570 is queried to determine the log-in sequences for the particular courts. The information is sent to search server 110, along with search criteria 192-216 including court identifier 413 (FIG. 6), for example. Based on court identifier 413, search server 110 accesses and searches either dial-up court databases or Internet court databases, as set forth in detail below.

In this particular embodiment, search server 110 refers to the values stored in the data fields in any of the databases shown in FIGS. 2, 6 and 8, for example, to make decisions throughout execution. However, any of the databases mentioned herein may be utilized as necessary. In addition, it should be noted that each court database is assigned its own unique identifier comprising numeric or alphanumeric values, or combinations thereof.

Figure 7:
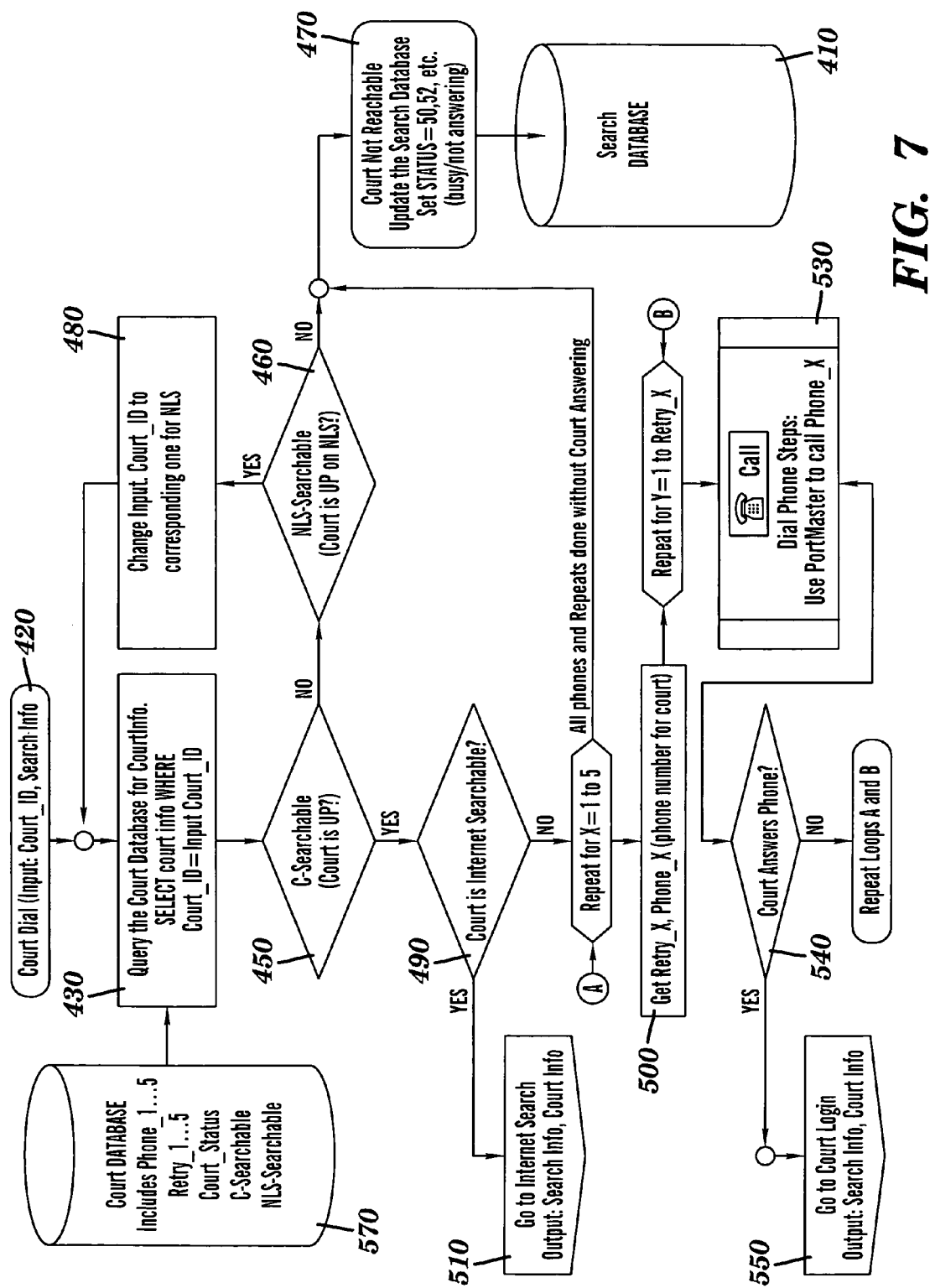
FIG. 7 is a flow chart of a process for deciding whether a search request involves a court database accessible through an Internet or dial-up connection, and accessing the appropriate court database, in accordance with another embodiment of the present invention.

Referring more specifically to FIGS. 7 and 8, beginning in step 420, a court database dialing is executed by search server 110. The search criteria, including identifiers stored in data fields representing the particular court databases to be searched, are retrieved from memory or directly from the various databases they are stored in (i.e., FIGS. 2, 6 and 8).

It should also be noted that the same court database (e.g., U.S. Supreme Court), may be accessed and searched through a number of ways, including the Internet, a dial-up connection or the National Locator Service ("NLS"), for example. Thus, for each court database, search server 110 maintains a record in COURT database 570 storing information particular to the court database in light of its access and search method. For example, if the U.S. Supreme Court database was accessible and searchable through a dial-up connection or an Internet connection, search server 110 would maintain two court database records in COURT database 570, including a record for the court database accessible through the Internet and a record for the court database accessible through a dial-up connection. Moreover, each of the records in COURT database 570 relating to the same court database are associated with each other for subsequent retrieval.

At step 430, search server 110 queries COURT database 570 to retrieve log-in ID 573, phone numbers 574($a$-$d$) and log-in keyboard sequence 575($a$-$c$) for the particular court database, for example. At step 450, search server 110 determines whether the court database is available for searching. A court database may be unavailable for searching for a number of reasons, including court database network access lines being down, court database telephone lines being down, court database systems being down or the court database having limited access times, for example. If the court database is available, search server 110 determines whether the court database can be searched through the Internet at step 490. If the court database can be searched through the Internet, at step 510, an Internet court database is accessed and searched in accordance with FIG. 17 and corresponding description, found further below.

However, if search server 110 determines at step 450 that the court database is unavailable for searching, then step 460 is executed to determine whether the court database is available for searching through the National Locator Service ("NLS"). If not, step 470 is executed and the status data field 415 in the search request record stored in SEARCH database 410 is updated to indicate that the court database is not available for searching, and search server 110 terminates executing the court database dialing. In this particular embodiment, status data field 415 can be updated to have a value of 50 to indicate that the court database is too busy to allow searching, or a value of 52 to indicate that the court database is not responding to access attempts, for example. Otherwise, step 480 is executed where search server 110 retrieves court ID 571 for the record in COURT database 570 associated with the same court database and being accessed and searched through the NLS.

Steps 430 and 450 are repeated, and if necessary steps 460-480, until search server 110 determines that the court database is available for searching. If so, search server 110 executes steps 490 and 510, as described above.

However, if search server 110 determines that the court database can not be searched through the Internet, then steps 500-540 are executed. In step 500, search server 110 retrieves one of the phone numbers 574($a$-$d$) associated with the court database from COURT database 570. In addition, one of the retry values 576($a$-$d$) corresponding to one of the phone numbers 574($a$-$d$) is retrieved, where each represents the number of attempts search server 110 will make to access the court database through the dial-up connection per phone number. In other embodiments, one value could be used for all of the phone numbers. Next, search server 110 executes a phone dialing application using modem bank 150 to contact (i.e., dial) the court database located at court dial-up server 160 at step 530. In this particular embodiment, it should be noted that search server 110 will use modem banks 150 located at servers situated across various parts of the country to avoid accruing long distance telephone charges and to increase redundancy. At step 540, search server 110 monitors whether court dial-up server 160 has answered the call. If search server 110 detects that court dial-up server 160 has answered the call, it executes a dial-up court log-out, discussed further below.

It should be appreciated that in this particular embodiment, and at least one of the other embodiments of the present invention, conventional communication devices can be used for attempting and further, accessing court dial-up servers 160. Thus, one having ordinary skill in the art, after reading the disclosure set forth in the present application, could implement this particular embodiment, and at least one of the other embodiments of the present invention, without undue experimentation.

If a predetermined amount of time has elapsed and search server 110 does not detect that court dial-up server 160 has answered the call at step 540, then search server 110 re-attempts accessing court dial-up server 160. Search server 110 attempts accessing court dial-up server 160 using the same phone number, thus repeating steps 530 and 540, as many times as indicated by the value stored in the corresponding retry values 576(*a-d*), or until it is determined at step 540 that court dial-up server 160 has answered the call. Moreover, steps 500-540, as described above, are repeated for each available court dial-up server 160 phone number, or until search server 110 determines that court dial-up server 160 has answered the call at step 540.

In this particular embodiment, five phone numbers are associated with each court database in COURT database 570. Thus, search server 110 will make up to five attempts to access court dial-up server 160, each time executing steps 500-540, unless it is detected at step 540 that court dial-up server 160 has answered the call. However, it should be appreciated that in other embodiments greater or fewer than five phone numbers can be associated with each court database.

It should also be appreciated that in other embodiments, different amounts of time can elapse before search server 110 determines whether court dial-up server 160 has answered the call. In this particular embodiment, no particular amount of time must be chosen. However, a number of factors can be considered in determining at what predetermined time interval search server 110 should determine whether court dial-up server 160 has answered a call. At least one of several factors includes how many attempts to access court dial-up server 160 have already been made using that particular phone number. Another factor includes the number of attempts to access court dial-up server 160 considering all of the phone numbers associated with the court database, for example. In other embodiments, one or more methodologies can be executed by search server 110 to adjust the time interval based on a number of factors, including the priority 412 of the search request, the amount of network traffic, system performance, system resources and number of search requests queued in SEARCH database 410 that are awaiting execution, for example.

In another embodiment of the present invention, search server 110 can execute step 540 by simply monitoring the number of telephone rings it detects have occurred in attempting to contact court dial-up server 160. For example, search server 110 can be programmed, or the court database dialing can include additional instructions, for concluding that court dial-up server 160 has not answered the call after six rings are detected, for example.

It should be noted that conventional communication devices can be used for detecting the number of rings that have occurred or the amount of time that has elapsed during a telephone call attempt, in accordance with this particular embodiment, and at least one of the other embodiments. Thus, one having ordinary skill in the art, after reading the disclosure set forth in the present application, could implement this particular embodiment, and at least one of the other embodiments, without undue experimentation.

Once search server 110 determines that the value stored in the corresponding retry value 576(*a-d*) limit has been reached (i.e., all of the phone numbers associated with court dial-up server 160 have been used to attempt accessing the court database), step 470 is executed and the status data field 415 in the search request record stored in SEARCH database 410 is updated to indicate that the court database is not available for searching, and search server 110 terminates executing the court database dialing. In this particular embodiment of the present invention, the status data field 415 can be updated to have a value of 52 to indicate that the court database is not responding to access attempts (i.e., not answering calls), for example.

Dial-Up Court Database Log-in

Referring generally to FIGS. 2, 6 and 8-10, a process for logging-in to dial-up accessible court databases in accordance with another embodiment of the present invention is described herein. Search server 110 queries COURT_LOGIN database 680 to retrieve the specific court database's log-in parameters. Search server 110 uses modem bank 150 to dial into court dial-up servers 160. If the line is busy, alternate numbers are used, with the court being dialed up to 10 (or more) times before a failure to connect is noted, as set forth in further detail below.

In this particular embodiment, search server 110 refers to the values stored in the data fields in any of the databases shown in FIGS. 2, 6 and 8, for example, to make decisions throughout execution. However, any of the databases mentioned herein may be utilized as necessary.

Figure 9:
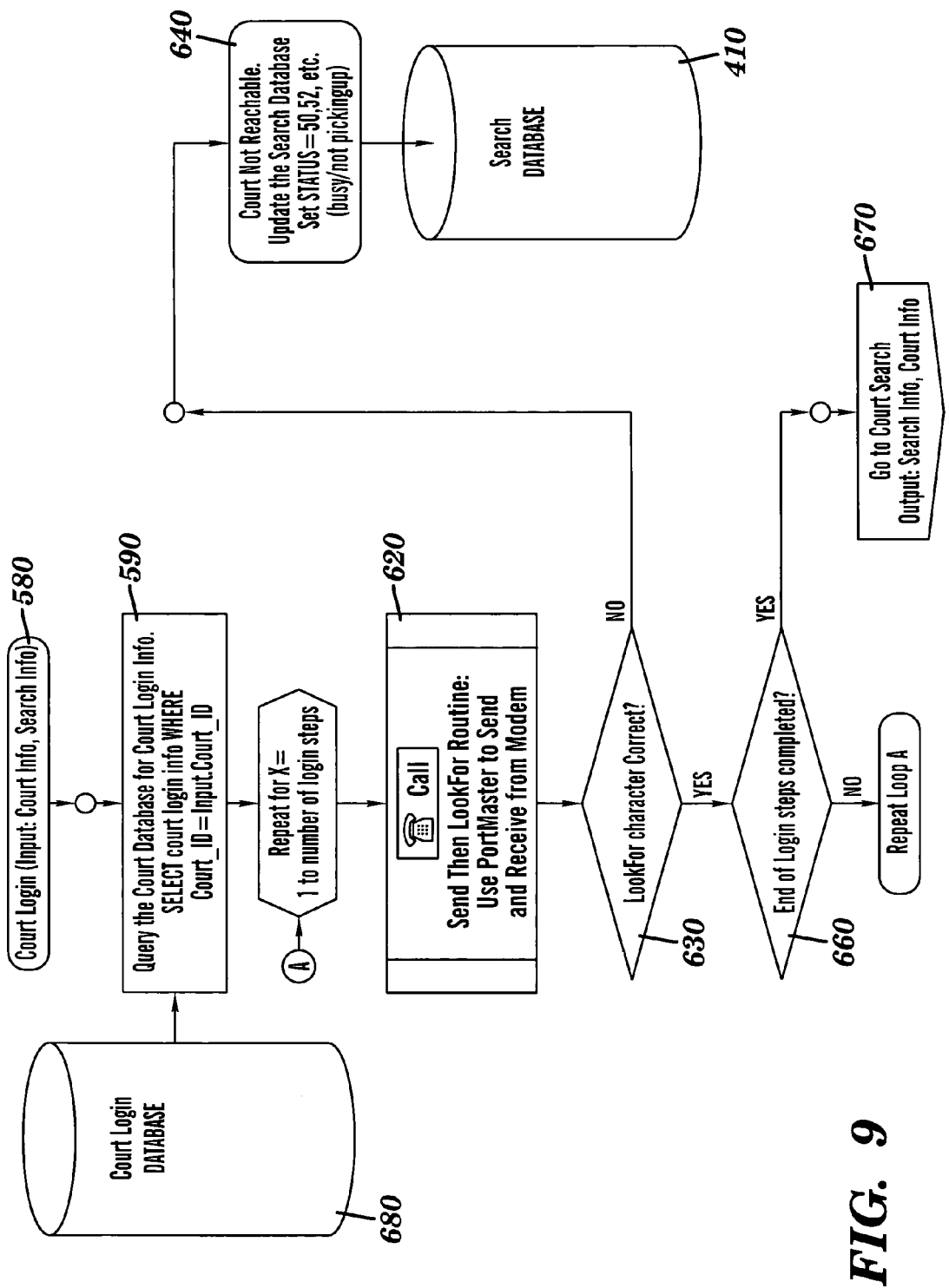
FIG. 9 is a flow chart of a process for logging-in to dial-up accessible court databases, in accordance with another embodiment of the present invention.

Referring specifically to FIGS. 9 and 10, beginning in step 580, a dial-up court database log-in is executed by search server 110. Search criteria 192-216, including identifiers stored in the data fields representing the particular court databases to be searched, are retrieved from memory. Next, in step 590, search server 110 queries COURT_LOGIN database 680 to retrieve the log-in information for the particular court database being logged into. Once the particular court databases log-in information has been retrieved from COURT_LOGIN database 680, search server 110 executes a series of data exchanges between search server 110 through modem banks 150 and court dial-up server 160 to establish a data connection. In particular, steps 620, 630 and 660 are repeated as many times as the number of log-in steps stored in the data fields in each record associated with a search request stored in COURT_LOGIN database 680. In another embodiment of the present invention, the number of log-in steps for a particular court database located on court dial-up server 160 can be stored in one of the data fields in COURT_LOGIN database 680 associated with a search request.

In particular, at step 620, search server 110 queries COURT_LOGIN database 680 for the next log-in step to be executed. In this particular embodiment, the exemplary record stored in data field 681 in COURT_LOGIN database 680 associated with a particular court database located on court dial-up server 160 is shown having Send_Char_1 as a first log-in step, comprising a character string having up to 10 letters. Search server 110 interprets data field 681 as an execution command to transmit the data stored in that field to court dial-up server 160, for example. Search server 110 queries COURT_LOGIN database 680 for the next log-in step to execute. Thus, the next data field 682 stored in Court_Login database 680 is retrieved by search server 110. In particular, a LookFor_Char_1 value is retrieved, which search server 110 interprets as requiring modem bank 150 to expect to receive data equivalent to the data stored in the data field 682 associated with LookFor_Char_1 in COURT_LOGIN database 680. Then, in step 630, if court dial-up server 160 transmits the expected data to search server 110 through modem bank 150, search server 110 decides that the received data matches the data stored in the data field 682. Steps 620, 630 and 660 are repeated as many times as there are log-in steps as described above. Otherwise, search server 110 decides that the received data does not match the value stored in the data field 682 associated with the particular log-in step.

It should be noted that the data received from court dial-up server 160 may not match the value stored in the data field 682 for a number of reasons. For example, the data transmitted to search server 110 may have been corrupted before reaching search server 110, court dial-up server 160 may have changed its log-in procedures, or court dial-up server 160 may have become too busy to be able to respond, for example. Thus, when the data do not match, step 640 is executed by search server 110. Specifically, the status data field 415 in the search request record stored in SEARCH database 410 is updated to indicate that the court database is not available for searching, and search server 110 terminates executing the dial-up court database log-in.

However, if the data stored in the data field 682 matches the data received from court dial-up server 160, then step 660 is executed by search server 110 to determine whether all of the log-in steps have been executed. In this exemplary case, COURT_LOGIN database 680 has additional log-in steps stored therein. Therefore, steps 620, 630 and 660 are repeated until the data received from court dial-up server 160 fails to match the expected data stored in court log-in database 680. Thus, after performing step 620, search server 110 expects to receive additional data as described above. Specifically, search server 110 expects to receive data from court dial-up server 160 that matches the data stored in the next data field 683. If the data received from court dial-up server 160 does not match the data stored in the data field 683, then step 640 is executed by search server 110 as described above.

Otherwise, step 660 is executed by search server 110 to determine whether the last log-in step has been executed, as discussed above. Again, if additional log-in steps are stored in COURT_LOGIN database 680, then steps 620, 630 and 660 are repeated. However, if data field 684 was retrieved from COURT_LOGIN database 680, in this particular example, representing the last log-in step, search server 110 executes step 670. In step 670, search server 110 executes a dial-up court database search, as discussed further below.

Dial-Up Court Database Search

Referring generally to FIGS. 2, 6, 8 and 11-12, a process for searching court databases located at dial-up servers 160 in accordance with another embodiment of the present invention is described herein. Once data connections with court databases are successfully established, search server 110 uses court-specific search parameters stored in COURT_SEARCH database 770 to search the court databases. Search criteria 192-216 (FIG. 3) are passed to the court databases according to the specific court databases' parameters and the search results are received. Once all of the search results have been received, search server 110 processes the executed search request data and stores the results, as set forth in further detail below.

In this particular embodiment, search server 110 refers to the values stored in the data fields in any of the databases shown in FIGS. 2, 6 and 8, for example, to make decisions throughout execution. However, any of the databases mentioned herein may be utilized as necessary.

Figure 11:
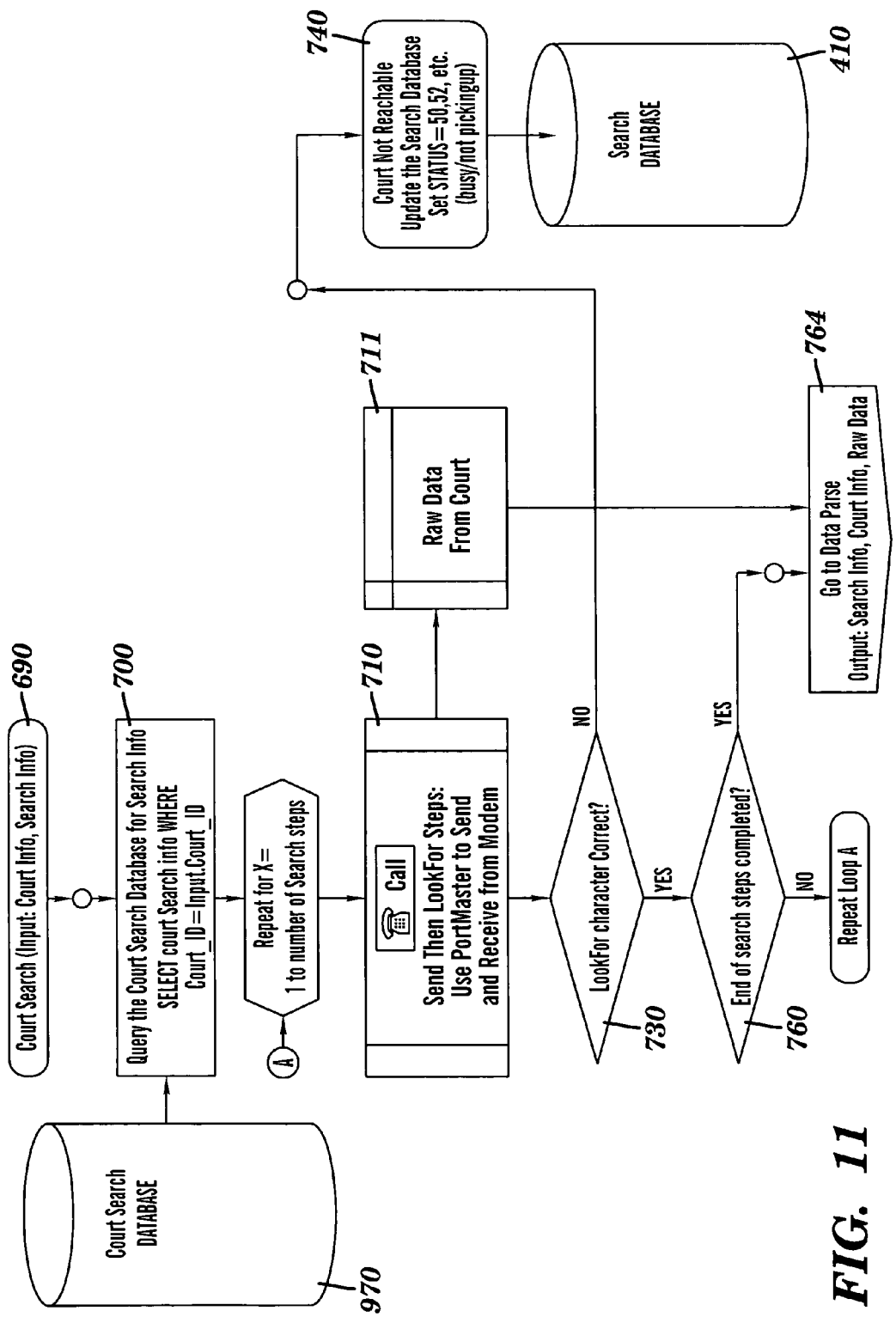
FIG. 11 is a flow chart of a process for searching dial-up accessible court databases for court records, in accordance with another embodiment of the present invention.

Referring more specifically to FIGS. 11 and 12, beginning in step 690, a dial-up court database search is executed by search server 110. Search criteria 192-216, including identifiers stored in data fields representing the particular court databases to be searched, are retrieved from memory or directly from the various databases they are stored in (i.e., FIGS. 2, 6 and 8).

At step 700, search server 110 queries COURT_SEARCH database 770 to retrieve a court search record corresponding to the particular court databases to be searched. Next, step 710 is executed where a similar process to the dial-up court database log-in described above in, and in particular steps 620, 630 and 660, is executed by search server 110 to retrieve search steps from COURT_SEARCH database 770 and for receiving data from the court database.

Specifically, in step 710 search server 110 queries COURT_SEARCH database 770 for a search step to be executed according to the data stored in each of the data fields in COURT_SEARCH database 770. Thus, search server 110 transmits/receives data to/from court dial-up server 160 according to the data fields and the data stored in COURT_SEARCH database 770. As data is received, it is stored in a memory, such as data mining database 781 for example, and is associated with the search request for later retrieval. At step 730, if the data received from court dial-up server 160 does not match the expected data stored in one of the data fields in COURT_SEARCH database 770, then step 740 is executed where the status data field 415 in the associated search request record stored in SEARCH database 410 (FIG. 6) is updated to indicate that the court database is not available for searching, and search server 110 terminates executing the dial-up court database search. Otherwise, step 760 is executed by search server 110. In particular, search server 110 determines whether all of the search steps stored in COURT_SEARCH database 770 have been executed. If all of the search steps have not been executed, then search server 110 repeats steps 710, 730 and 760 until either step 740 is executed or search server 110 determines in step 760 that the last search step has been executed. Once search server 110 determines that the last search step has been executed at step 760, data parsing and storing is executed, as described more fully below.

In accordance with another embodiment of the present invention, during execution of the dial-up court database search, raw data 711 received was filtered, sorted and checked for consistency, and stored in data mining database 781, discussed further down below. An example of a consistency check includes the following. Often, raw data 711 will contain a data item that identifies the number of data items contained within it. For example, such a data item can specify "Number of Items: 33." This can refer to the number of court case items found by executing a particular search request. Search server 110 compares the value (i.e., 33) with the number of docket sheets actually processed and found by it after parsing raw data 711. It should be noted that parsing methodologies in accordance with one or more embodiments of the present invention will be discussed further below.

Another example of a consistency check performed includes analyzing the date of the oldest court case docket item found, which is checked against the oldest court case docket item found from a search for the same criteria in the data mining database 781. Yet another example of a consistency check performed includes comparing the size of raw data 711 for a particular search request against the size of raw data 711 for the most recent search request associated with the same search criteria (FIG. 3) found in the data mining database 781.

Data Parse & Store

Referring generally to FIGS. 2, 3, 6, 8, 13, 13*a* and 14, a process for processing data received from executed search requests and storing the results in accordance with another embodiment of the present invention is described herein. Search criteria 192-216 (FIG. 3), including identifiers stored in data fields representing the particular court databases searched, court information, and the raw data 711 received after executing the dial-up court database search or the Internet court database access and search, are used by search server 110 to parse and store the results, as set forth in further detail below.

In this particular embodiment, search server 110 refers to the values stored in the data fields in any of the databases shown in FIGS. 2, 6 and 8, for example, to make decisions throughout execution. However, any of the databases mentioned herein may be utilized as necessary.

Figure 13:
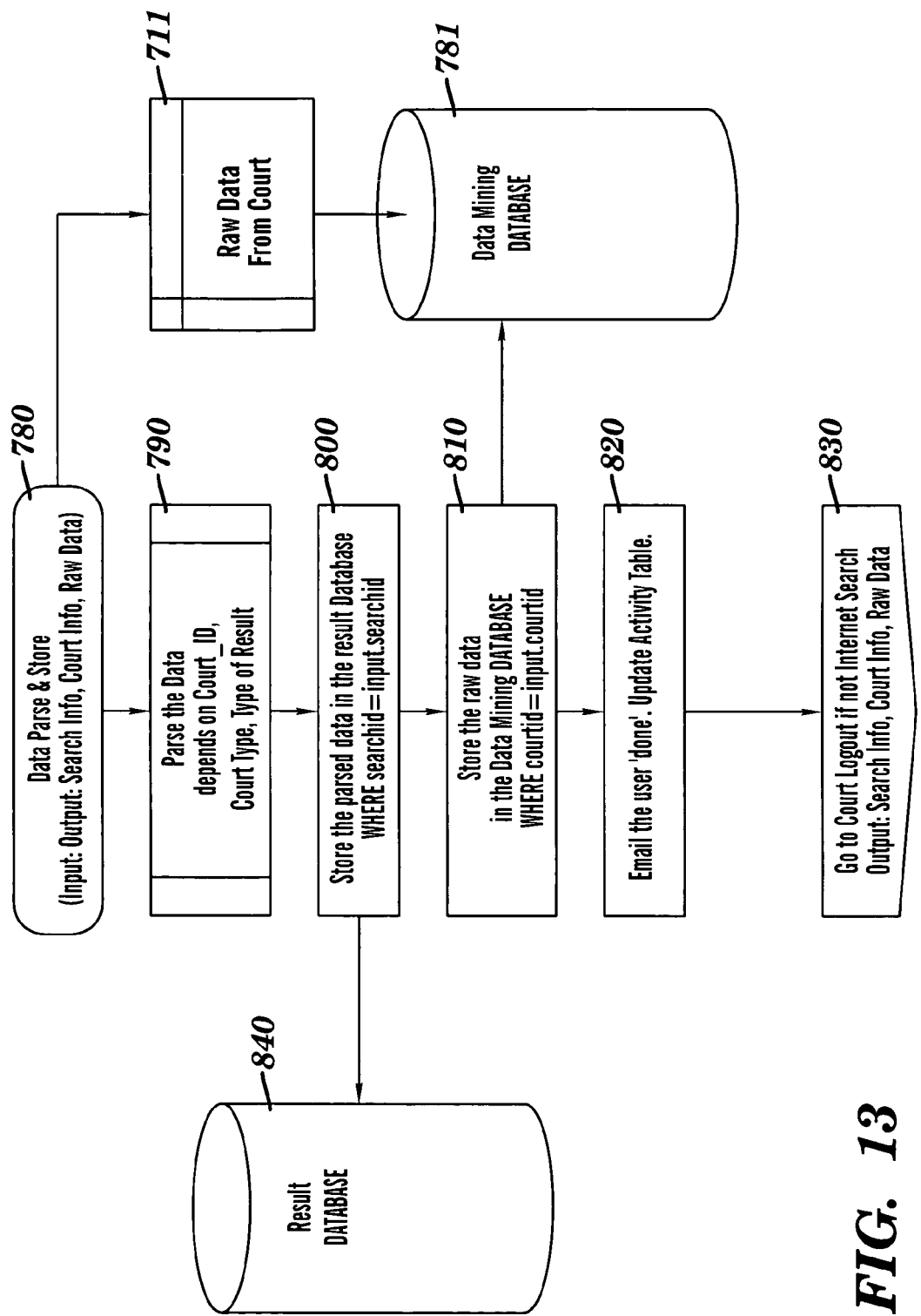
FIG. 13 is a flow chart of a method for parsing and storing search results of court database searches, in accordance with another embodiment of the present invention.

Referring more specifically to FIGS. 13 and 14, beginning in step 780, a data parsing and storing is executed by search server 110. In this particular embodiment, in step 790, search server 110 executes one of several parsing methodologies to analyze the raw data 711 received from the court databases by search server 110 during execution of the dial-up court database search described above. In particular, search server 110 selects the particular methodology for parsing the raw data 711 based on a number of factors. It should be appreciated that many factors can be analyzed by search server 110 in selecting the appropriate methodology for parsing the raw data 711. However, in this particular embodiment, search server 110 selects the appropriate methodology for parsing the raw data 711 based upon the particular court database the raw data 711 was received from, the type of court (i.e., Federal or State), and the type of raw data 711 received. In another embodiment, search server 110 can select the particular parsing methodology based upon the content of the raw data 711.

In this particular embodiment, the type of raw data 711 that can be received from court databases can include a list of names where multiple search results were found in response to a user's executed search request, for example. Additionally, the raw data 711 can include full text results received in response to an executed search request, including results received depending upon the particular search requested. For instance, a search request of the attorneys involved in a particular court case will receive as raw data 711 the names of the attorneys and possibly their state bar membership information, for example.

Furthermore, search server 110 administrators can select which factors the methodology should consider in selecting which parsing methodology to execute, as represented by the data fields in any of the exemplary databases shown in FIG. 2, 6 or 8.

It is important to note that different court databases and types of courts store their electronic court records differently. Furthermore, data records received from court databases will also vary depending upon the different types of searches requested by users. Thus, search server 110 is able to parse the raw data 711 received during the execution of the court database search since it can determine which parsing methodology will be able to correctly parse the raw data, based on the foregoing factors.

In another embodiment of the present invention, search server 110 administrators can associate the selected data fields being analyzed by search server 110 during selection of the appropriate parsing methodology with weighting values to indicate their respective degree of importance during the execution of the parsing and storing. Thus, search server 110 will factor the particular weighting values associated with each data field and analyze each of the values stored in the data fields. For example, search server 110 can place greater emphasis on a selected data field associated with a particular weighting factor when analyzing each of the selected data fields, where the weighting factor indicates that deference should be accorded to the data field.

In another embodiment of the present invention, at least one methodology utilizing AI is utilized for analyzing the selected data fields and determining the appropriate parsing methodology for search server 110 to execute. In addition, the selected data fields may be assigned weighting values as described above. Search server 110 analyzes the selected data fields in much the same way as described above, however, employing at least one AI methodology for analyzing the values of the selected data fields in view of their assigned weighting values in selecting the appropriate parsing methodology to execute.

Figure 13A:
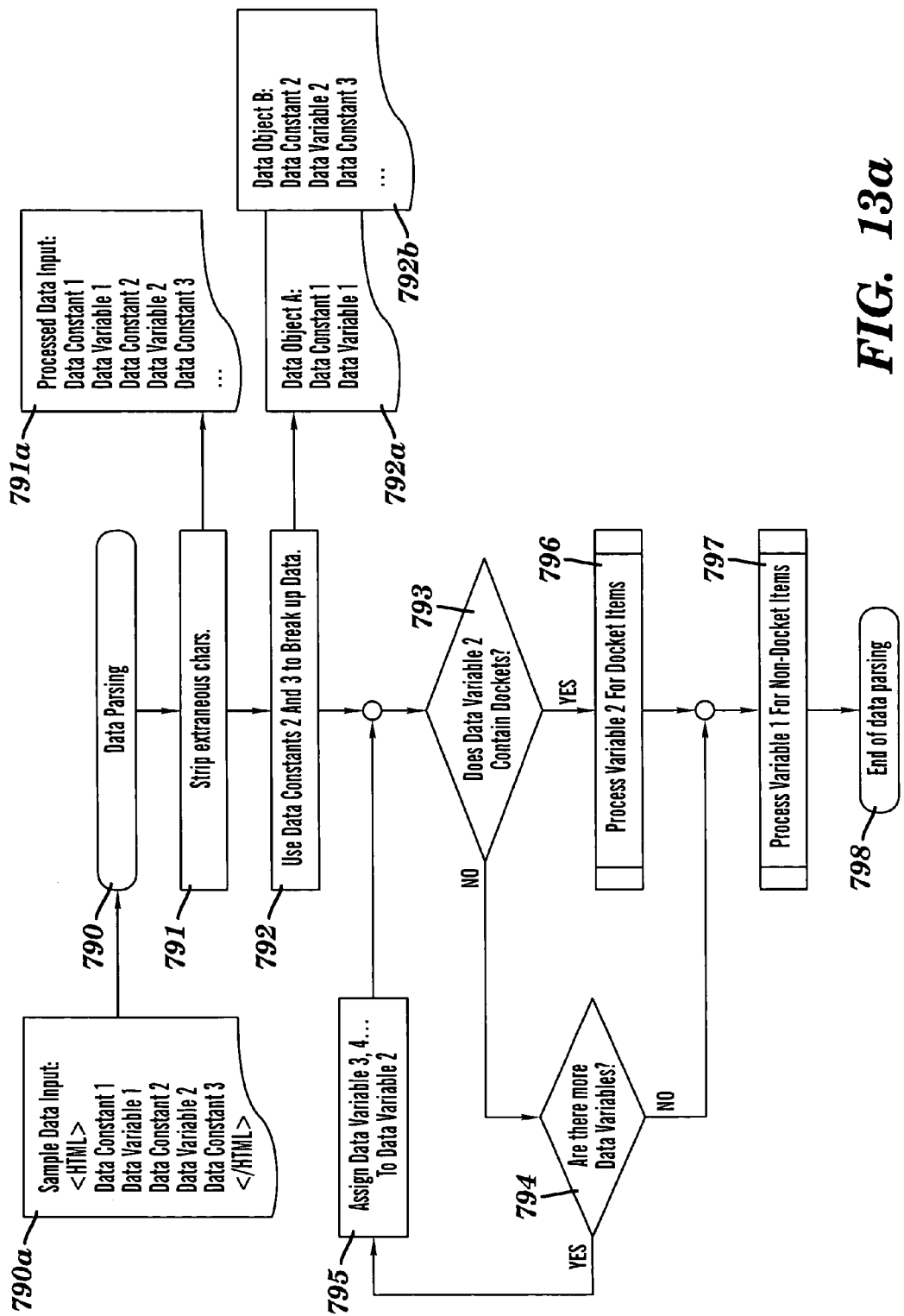
FIG. 13*a* is a flow chart of a process for parsing search results of court database searches, in accordance with another embodiment of the present invention.

Referring more specifically to FIG. 13*a*, a more detailed description of the general parsing methodology mentioned in step 790, in accordance with this particular embodiment of the present invention, is set forth herein. As mentioned above, search server 110 employs parsing methodologies that are tailored for each particular court, each group of particular courts, each type of court (i.e., Federal or State), each group of a single type of courts or the type of search results received.

However, it should be understood that regardless of the particular parsing methodology selected by search server 110 to execute in response to the above noted factors, the same or substantially similar parsing methodology as described further below is utilized. However, it should be understood that there may be exceptions where the below described parsing methodology should be modified slightly in parsing the particular data based on the forgoing factors. Notwithstanding such modifications, an artisan having ordinary skill in the art, if necessary, would be able to make the appropriate modifications without undue experimentation.

Beginning at step 790, search server 110 parses raw data 711 received from a court database accessible through network 130 or through a dial-up connection. In this particular example, search server 110 receives data input 790*a* from a court database accessible through network 130 (i.e., the Internet). At step 791, data input 791*a* is stripped of extraneous and artifactual characters. Web pages, for instance, contain various descriptors or tags, such as "<HTML>," which are irrelevant to the data parsing and are thus stripped. With respect to court databases accessible through dial-up connections, non-ASCII characters are stripped, since they are artifacts from the modem data transmission process. Thus, processed data input 791*a* is created.

Next, at step 792, search server analyzes processed data input 791*a* to search for data constants, such as a "Begin of docket" or an "End of docket" marker, for example. Each data constant is marked so that the data object (i.e., processed data input 791*a*) can be broken down into smaller data objects. Thus, in this particular example, processed data input 791*a* is broken down into data objects 792*a*, 792*b*. Search server 110, utilizing heuristically determined methodologies, analyzes data objects 792*a*, 792*b* to determine which one has the higher likelihood of containing court case docket items or documents, henceforth referred to as "docket items." In this example, assume data object 792b is determined to have a higher likelihood of containing docket items. Data object 792b is then processed further to extract each docket item contained within it, one at a time.

Thus, in step 793, search server 110 analyzes data object 792b to determine whether each data variable it contains includes docket information. In this particular embodiment, search server 110 analyzes data object 792b to search for date string formats such as dd/mm/yy or dd/mm/yyyy, for example, at or near the beginning of each new line, to find data variables. Once search server 110 finds a data variable within the data object, it determines whether the data variable (i.e., Variable 2) contains docket information. At step 793, if search server 110 determines that the data variable contains docket information, it processes the data variable to extract the docket information contained within it at step 796, and then proceeds to step 797. If at step 793 search server 110 determines that the data variable does not contain docket information, it proceeds to step 794. At step 794, search server 110 determines whether data object 792b contains additional data variables. If so, then at step 795, the next data variable (i.e., Variable 3) is assigned to be analyzed by search server 110 to determine whether it contains docket information at step 793. Thereafter, steps 794, 795 and 793 are repeated until all of the data variables contained within data object 792b have been analyzed by search server 110.

If search server 110 determines at step 794 that there are no more data variables left to analyze in data object 792b, each of the data variables contained within data object 792a are processed for non-docket information. At step 798, each of the data variables contained within data object 792a have been processed for non-docket information, and thus all of the raw data 711 received from a court database has been parsed by search server 110.

In another embodiment of the present invention, a variety of data variables are often associated with particular data objects or are found in a particular order within the data objects. For example, a court case filing date is almost always found within a non-docket data object (i.e., data object 792a). Such data variables, referred to hereafter as tentative data, are further analyzed by search server 110 to detect the presence of particular identifying characteristics. For example, the text "Filing Date: 11/12/1999" could be found by search server 110 searching for the regular expression "[F|f]i[^:]*: *[0-3]?[0-9]/[0-1]?[0-9]/[0-9][0-9]?[0-9]?". This would allow filing dates that had minor typographical errors or varying date formats (e.g., 4/4/1999, 04/04/1999, etc.) to all be found. If the tentative data item meets the criteria as described above, the data itself is stripped, normalized, and stored in one or more databases in storage 112.

Once search server 110 has completed execution of the parsing (step 798), step 800 (FIG. 13) is executed. In particular, the parsed data is stored in Result database 840. In step 810, the raw data 711 received during execution of the court database search is saved in a database, such as data mining database 718, for example. It should be appreciated that the raw data 711 received from all of the executed search requests are all accumulated in data mining database 781 and indexed according to the court database they were retrieved from. In another embodiment of the present invention, before court databases are accessed, search server 110 searches Data Mining table, as described further below. Users are sent e-mail messages, for example, in step 820 to notify them that their search request has been completed, in this particular embodiment of the present invention.

In another embodiment, searches at the court will sometimes produce a list of names and/or rather than a single case information and docket result, as described above. These search results are also parsed and stored in such a way that the court and case information is stored allowing for subsequent searches on a particular case. In particular, the list of names and/or cases that are yielded from executed search requests are entered into RESULT database 840 such that the information stored allows users to submit new search requests on that name or case number from a particular court database. The data stored in RESULT database 840 therefore contains enough data to mimic a search request submitted by users through search interface 180 (FIG. 3).

All search results are stored in a RESULT database 840. At the same time, SEARCH database 410 (FIG. 6) is updated to indicate that the search request has been executed. In addition, subsequent search requests are stored so that they are related to an original search request.

Data Mining Searches

In another embodiment of the present invention, search server 110 can execute search requests of results from past executed search requests that have been stored in a database, such as the data mining database 781 mentioned earlier, allowing users of search server 110 to request court case records searches and providing them with access to the data stored therein, hereinafter referred to as data mining searches. Users can search for and retrieve electronic court case docket sheets or court case items or documents, for example, that have been stored in the data mining database 781, as set forth in further detail below.

In this particular embodiment, when this type of search is performed, it is transparent to the user since server 110 automatically searches the data mining database 718 before executing court database searches as described herein. In another particular embodiment, search server 110 can execute methodologies provided with parameters for determining when or when not to first execute searches of data mining databases 718. For example, when search server 110 gains access to a new court database it was not able to access previously, it is readily apparent that the chances of executing a data mining search and finding the court case records or items associated with search criteria 192-216 are low since the data mining database 781 may not contain much data. Thus, it would be more efficient in terms of saving search server 110 system resources to forego such a data mining search. In another embodiment, users can select whether they would like to perform such data mining searches with respect to results of their own past search requests stored in the data mining database 718. Alternatively, users can select performing data mining searches of not only their own results but of all the available past search requests.

Dial-Up Court Log-Out

Referring generally to FIGS. 2, 6, 8 and 15-16, a process for logging-out of dial-up accessible court databases in accordance with another embodiment of the present invention is described herein. After processing and storing the data from executed search requests in RESULT database 840, the court database is logged-out of using the specific court database's parameters stored in COURT_LOGOUT database 950. However, if the user has additional search requests for search server 110 to execute, search server 110 does not log-off the court database. Instead, search server 110 re-executes the select a search methodology described in detail above.

In this particular embodiment, search server 110 refers to the values stored in the data fields in any of the databases shown in FIGS. 2, 6 and 8, for example, to make decisions throughout execution. However, any of the databases mentioned herein may be utilized as necessary.

Figure 15:
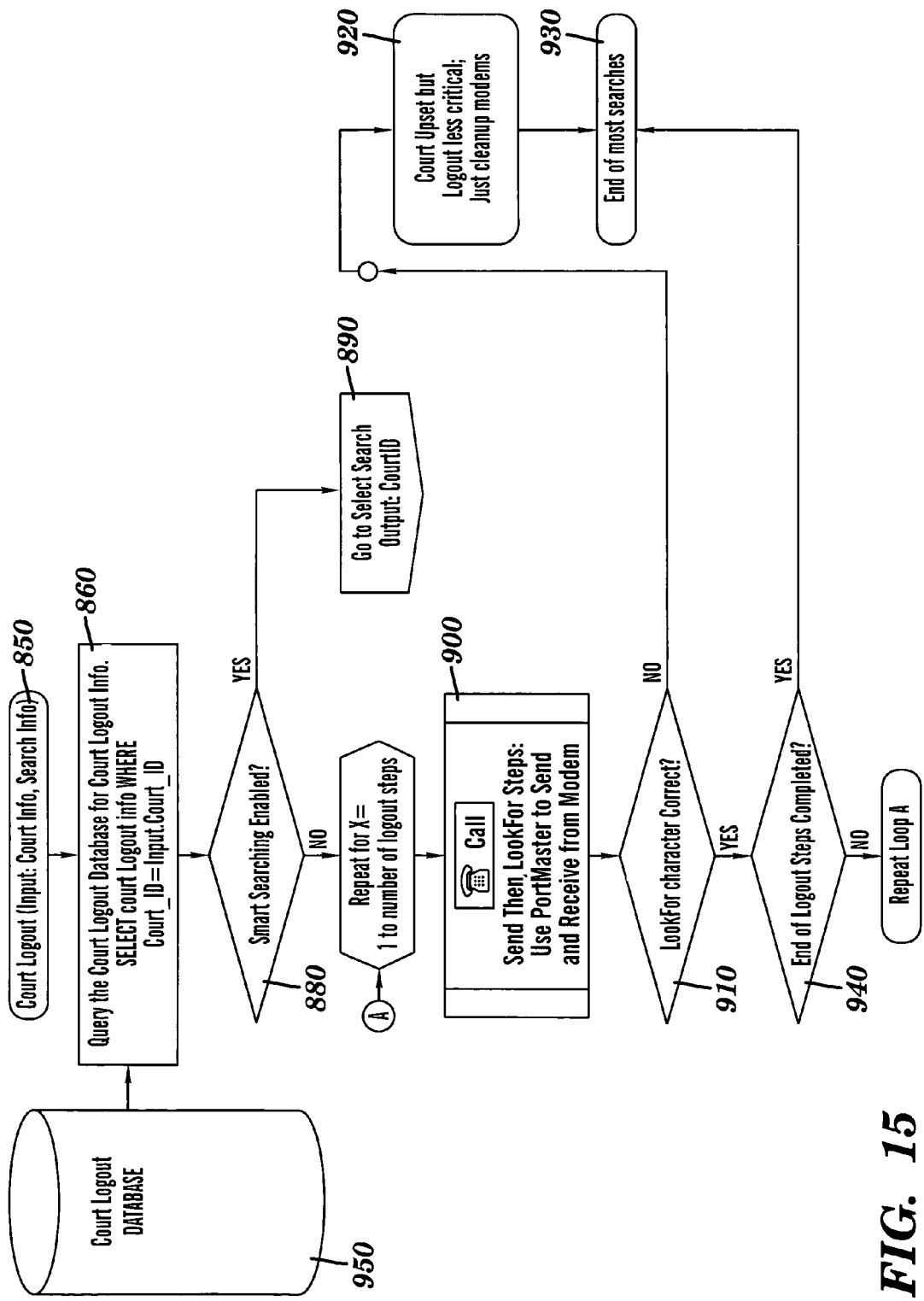
FIG. 15 is a flow chart of a process for logging-out of dial-up accessible court databases, in accordance with another embodiment of the present invention.

Referring specifically to FIGS. 15 and 16, beginning in step 850, a dial-up court database log-out is executed by search server 110. At step 860, search server 110 queries COURT_LOGOUT database 950 to retrieve the specific court database's log-out parameters. At step 880, search server 110 determines whether smart searching has been enabled. In this particular embodiment, smart searching allows search server 110 to determine whether the user who submitted the search request has any other search requests to execute in the same court database.

In this particular embodiment of the present invention, users control whether smart searching is enabled. In another embodiment, search server 110 administrators decide whether smart searching is enabled. If smart searching is enabled, step 890 is executed, and search server 110 executes the select a search methodology described in detail above. Otherwise, search server 110 proceeds to log-out of the court database by executing steps 900, 910 and 940, as many times as necessary, as will be described below.

Beginning in step 900, search server 110 executes a series of data exchanges between search server 110 through modem banks 150 and court dial-up server 160 to terminate a data connection. In particular, steps 900, 910 and 940 are repeated as many times as the number of log-out steps stored in the data fields in each record associated with a search request stored in COURT_LOGOUT database 950. In another embodiment of the present invention, the number of log-out steps for a particular court database located on court dial-up server 160 can be stored in one of the data fields in COURT_LOGOUT database 960 associated with a search request.

Since the series of data exchanges between search server 110 through modem banks 150 and court dial-up server 160 for executing a dial-up court database log-out are similar to the series of data exchanges executed in steps 620, 630 and 660 (FIG. 9) with respect to executing a dial-up court database log-in, the process will not be repeated except to point out any differences. For example, at step 910, if search server 110 decides that the received data does not match the value stored in a data field associated with a particular log-out step, as discussed in detail above in other embodiments, search server 110 executes step 920 and simply logs-out of the court database at that point. Also at step 910, if search server 110 determines that the last log-out step stored in one of the data fields in COURT_LOGOUT database 940 has been executed, search server 110 terminates the data connection and logs-out of the court database. Search server 110 then selects another search for executing as described above in detail.

Internet Court Database Access and Search

Referring generally to FIGS. 2, 6, 8 and 16, a process for searching court databases accessible through network 130, which includes the Internet, for example, in accordance with another embodiment of the present invention is described herein. Search server 110 uses network 130, which in this particular embodiment comprises the Internet, through a TCP/IP network connection to connect to and log into the court database, for example. Search requests are then passed to the court databases and the search results are retrieved, parsed and stored as described above.

In this particular embodiment, search server 110 refers to the values stored in the data fields in any of the databases shown in FIGS. 2, 6 and 8, for example, to make decisions through execution. However, any of the databases mentioned herein may be utilized as necessary.

Figure 17:
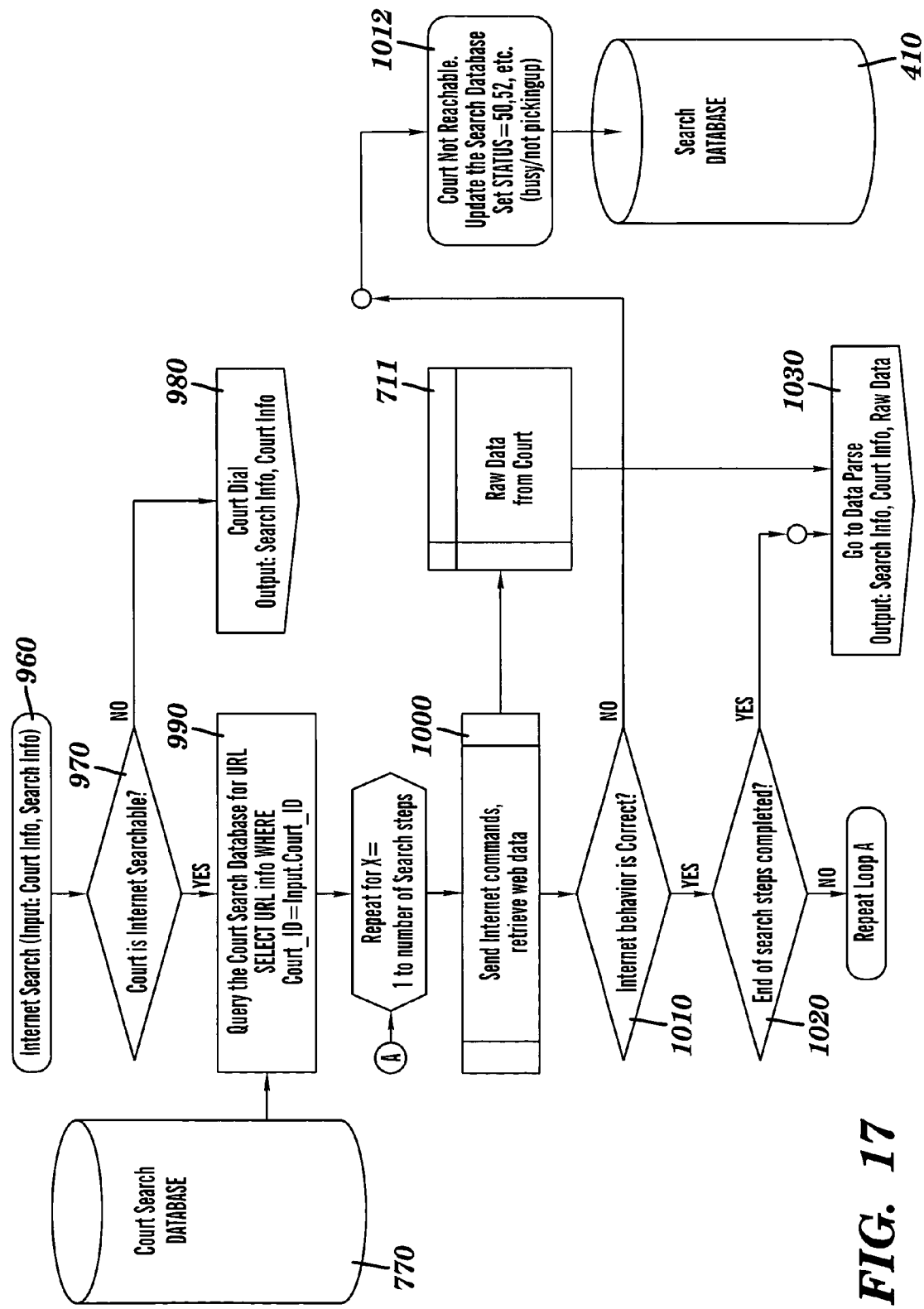
FIG. 17 is a flow chart of a process for searching Internet accessible court databases for court records, in accordance with another embodiment of the present invention.

Referring specifically to FIG. 17, beginning in step 960, an Internet court database access and search is executed by search server 110. At step 970, search server 110 determines whether the court database associated with the search request can be searched through network 130. If search server 110 determines that the court database can not be searched through network 130, then the court database dialing previously set forth above is executed at step 980. Otherwise, at step 990, search server 110 queries COURT_SEARCH database 770 to retrieve a court search record corresponding to the particular court databases to be searched through network 130.

Next, since steps 1000-1020 are similar to steps 710, 730, 760 described above for the dial-up court database search, they will not be described in detail here, except to point out any differences. Search server 110 executes steps 1000-1020 until all of the search steps stored in COURT_SEARCH database 770 have been executed. As data is received by search server 110 from the court database being accessed through network 130, it is stored in a memory, such as the data mining database 781 (FIG. 13) described above, for example, and is associated with the search request for later retrieval.

At step 1010, search server 110 determines whether there are any problems with the data it is retrieving from the court database accessible through network 130. A variety of problems can occur, such as time-outs beyond a predetermined response window, data fragments received instead of intact data, and receiving particular keywords that indicate bad data (e.g., "ERROR" or "404").

If search server 110 determines that the court database accessible through network 130 does not appear to be responding or is not responding as expected as a result of one or more of the problems identified above, then step 1012 is executed where the status data field 415 in the associated search request record stored in SEARCH database 410 is updated to indicate that the court database is not available for searching, and search server 110 terminates executing the Internet court database access and search. Otherwise, step 1020 is executed by search server 110. In particular, search server 110 determines whether all of the search steps stored in COURT_SEARCH database 770 have been executed. If all of the search steps have not been executed, then search server 110 repeats steps 1000-1020 until either step 1012 is executed or search server 110 determines in step 1020 that the last search step has been executed. Once search server 110 determines that the last search step has been executed at step 1020, step 1030 is executed and the data parsing and storing described in detail above is executed by search server 110.

Displaying the Results

Figure 20:
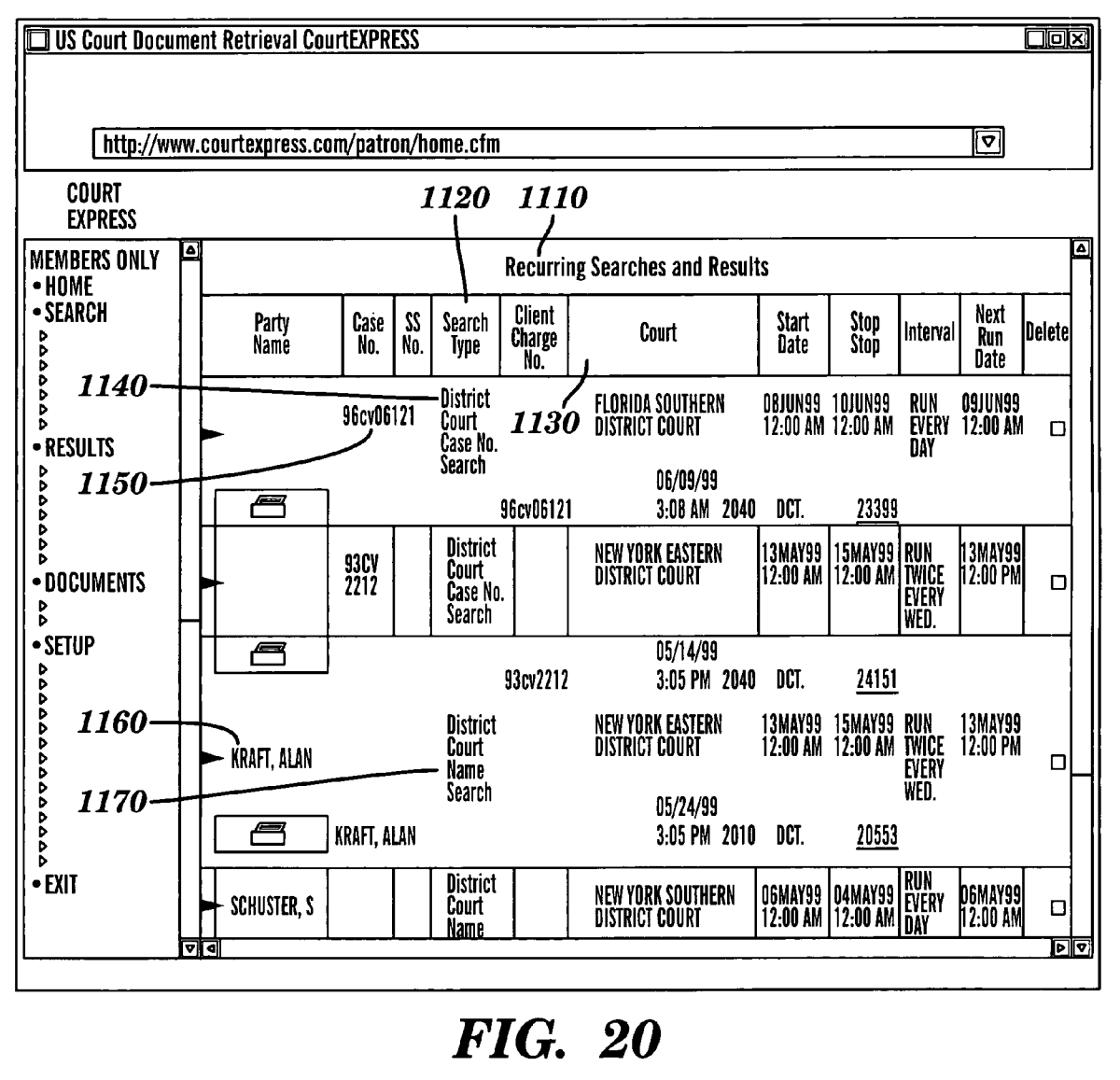

Referring generally to FIGS. 18-20, several exemplary executed search results in accordance with another embodiment of the present invention are described herein. In this particular embodiment, users can submit a checklist of required items to be obtained by a document retrieval service. In another embodiment, users can monitor docket information with a recurring search, which is defined by a user by providing a time interval. In other embodiments, users can perform off-line searches, wherein a search is requested and search server 110 notifies users via e-mail, for example, when the search has been completed, as set forth in further detail below.

Referring more specifically to FIG. 18, an exemplary screen print of one of the Web pages 122 displayed by client computers 120 shows the court records for a particular court case obtained from executing a court database search, in accordance with another embodiment of the present invention. A variety of information is displayed, including the name of the user 1040 logged into search server 110 and the particular judge involved in the case 1050, for example. In addition, users can scroll further down the page to view additional information by clicking on scroll button 1060, for example.

Referring more specifically to FIG. 19, another portion of Web page 122 illustrated in FIG. 18 after scrolling further down the page is illustrated in accordance with one embodiment of the present invention. Specifically, selectable, individual court items or documents 1090 contained in the court records for the particular court case are shown. Users can check one or more of check-boxes to select particular items or documents 1080. In this particular embodiment, users may click on order button 1070 for accessing, viewing, retrieval, purchasing or delivery, for example. In another embodiment, users may click on check-boxes to complete the transaction. In this particular embodiment, the associated accessing, viewing, retrieval, purchasing or delivery fees are billed to the user's account previously set up with search server 110. In other embodiments, users who do not have an account previously set up with search server 110 may set up an account at this time or may simply pay the associated fees using a credit card, for example. Further, users can scroll further down the page to view additional ordering information, if necessary, by clicking on scroll button 1100, for example.

Once users have made their selections, search server 110 causes an online menu to be displayed on their display devices (i.e., computer monitors, palm-top computer displays, etc). The menus includes fields for users to fill in for completing the transaction, which includes time and shipping requirements, client reference numbers, contact phone numbers and any other notations which are necessary to complete the transaction. The information entered by the user is transmitted to search server 110. In this particular embodiment of the present invention, the information is entered by the user through a Web page form created in HTML, for example, that is e-mailed directly to search server 110 for processing. In another embodiment, a work order is displayed allowing the user to double check for accuracy.

In this particular embodiment of the present invention, once search server 110 receives item or document orders associated with a court case docket sheet, search server 110 searches one or more databases in storage 112 to determine if the particular items or documents identified in the order have been previously ordered and stored in electronic format in storage 112. If one or more of the items or documents are found in storage 112, they are retrieved and sent to the users.

In another embodiment, if the items or documents are not found in storage 112, search server 110 notifies its administrators of a received court case item or document. Search server 110 administrators then route the item or document orders to the appropriate personnel for processing and retrieval of the items or documents. In other embodiments, item or document orders are forwarded directly to the appropriate personnel for processing and retrieval. Personnel handle various billing functions not handled by search server 110. In this particular embodiment, the personnel are responsible for ordering and retrieving the items or documents from a court documents retrieval service. In other embodiments, daily document pickup runs can be pre-arranged with a set group of document retrieval companies, depending on court coverage, to expedite and mitigate document retrieval fees, for example.

In another embodiment, users who have requested searches and logged-off search server 110 are notified via e-mail, for example, that their search requests have been executed. Once notified, users can log-on search server 110 and display the search results. As explained above, for each item or document associated with the case docket sheet, search server 110 provides a check-box for allowing users to select items or documents to be retrieved from the court.

In another embodiment of the present invention, search request results are e-mailed to the user or those designated by the user. Thus, users can view the search request results offline. In another embodiment, users are provided with the option of ordering documents without logging back in to server 110. In another embodiment of the present invention, search server 110 allows users to forward docket sheets via e-mail to other individuals. In turn, those individuals may then review the docket sheet and select items to be ordered through server 110. Both the requestor and initiator of the search request are notified via e-mail that the selected items have been ordered, thereby keeping all of the parties informed of account activity. In addition, one e-mail message may be sent by server 110 to cover multiple requests.

In one particular embodiment of the present invention, ordered items or documents can be sent to users as e-mail attached electronic documents in a variety of formats or formatted in HTML and sent in an e-mail. In another embodiment, the items or documents are stored in search server 110 in the user's account to be retrieved by the user from search server 110 and displayed on the display device of client computer 120. In various other embodiments, the items or documents can be mailed, including express and overnight, faxed or delivered using other types of courier services, for example.

Referring more specifically to FIG. 20, an exemplary screen print shows a recurring searches and results Web page 1110 displayed by client computers 120 in accordance with one embodiment of the present invention. Web pages 122 can be customized to show the various types and results of the user's recent court database search requests, including the user's profiles, a list of documents previously selected for purchasing and delivery, and the user's list of requested recurring searches.

In this particular embodiment of the present invention, Web page 1110 shows the search type 1120 the user chose (e.g., District Court Case Number Search 1140), the courts 1130 the user chose to search 1130 and the Case No. 1150 the user searched for. Web page 1110 also shows that the user requested a District Court Name Search 1170 using a specific name 1170.

It should be noted that in this particular embodiment of the present invention, the search results can be viewed by users in several other ways. For example, in one particular embodiment a standard name/docket complete result can be viewed online or sent as an e-mail to users or others designated by them. In another embodiment, the results can include a list of names that can be viewed online, e-mailed to the user or others selected by the user, used to request another search on that name only (although this usually results in a complete standard name/docket result) or be printed. In addition, recurring results that are identical to the results described above may also be obtained.

The need for information is becoming increasingly more important. It is vital that professionals and others have instantaneous access to court records and the means for conveniently requesting and retrieving the documents identified in the court records.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for retrieving data, comprising:
    selecting one of a plurality of user input, stored electronic records search requests from a queued search database to execute next based upon one or more selection criteria;
    determining which of two or more different types of communication medium can be used to access at least one of a plurality of electronic records databases associated with the selected one of the electronic records search requests;
    retrieving instructions for accessing the at least one of a plurality of electronic records databases based on at least one of the determined types of communication medium which can be used to access the at least one of the plurality of electronic records databases;
    accessing the at least one of the plurality of electronic records databases with the retrieved instructions;
    executing the selected electronic records search request and retrieving at least one electronic record from at least one storage location during the executing, wherein the at least one electronic record comprises results of an executed electronic records search request, at least one criterion used in formulating the electronic records search request and data related to at least one electronic database associated with the electronic records search request;
    parsing the electronic records to convert one or more raw data sets into user-selectable objects;
    determining at least one data parsing algorithm that should be used for parsing the at least one retrieved electronic record based upon a content of the at least one retrieved electronic record; and executing the parsing using the at least one determined data parsing algorithm; and
    causing the user-selectable objects to be displayed.

2. The method of claim 1 further comprising selecting at least one of the user-selectable objects to retrieve the raw data set associated with the selected object.

3. The method of claim 1 wherein the raw data sets comprise court case items or documents associated with a court case docket sheet.

4. The method of claim 1 wherein the electronic records comprise results of an executed electronic court case records search request, at least one criterion used in formulating the electronic court case records search request and data related to at least one electronic court database associated with the electronic court case records search request.

5. The method of claim 1 wherein the parsing further comprises extracting the at least one raw data set from the retrieved electronic records.

6. The method of claim 1 wherein the parsing is implemented by at least one data processing algorithm based substantially on artificial intelligence.

7. The method of claim 1 wherein the parsing further comprises filtering, sorting or analyzing the retrieved electronic records for data consistency.

8. The method of claim 1 wherein the plurality of electronic records databases comprises at least one first electronic court database accessible through the first communication medium and at least one second electronic court database accessible through the second communication medium.

9. The method of claim 1, wherein the first communication medium comprises a telephone dial-up modem connection and the second communication medium comprises an Internet connection.

10. The method of claim 1 wherein the electronic records search requests comprise court case docket sheet search requests.

11. The method of claim 1 wherein the selecting one of the plurality of electronic records search requests to execute next based upon the one or more selection criteria further comprises examining search data associated with each of the electronic records search requests and evaluating the search data using the one or more selection criteria.

12. The method of claim 11 wherein the one or more selection criteria comprise how many times an examined electronic records search request has failed, an age of the examined electronic records search request, how busy one or more databases associated with the search data are, how many phone lines are available to access the one or more databases associated with the search data, a status of the examined electronic records search request, how many attempts have been made to execute the examined electronic records search request, when the examined electronic records search request was last updated, and when any activity associated with the examined electronic records search request last took place.

13. The method of claim 1 wherein one or more of the stored search requests are stored in a search database when the search request cannot be executed at the time the search request is made.

14. The method of claim 1 further comprising retrieving one or more hard-copy documents associated with a selected user-selectable object.

15. A system for retrieving data, comprising:
    at least one station operatively connected to at least one storage location; and
    at least one processor operatively connected to the at least one station and the at least one storage location, the at least one processor executing a program of instructions for selecting one of a plurality of user input, stored electronic records search requests from a queued search database to execute next based upon one or more selection criteria;
    determining which of two or more different types of communication medium can be used to access at least one electronic records database associated with the selected one of the electronic records search requests; retrieving instructions for accessing the at least one electronic records database based on at least one of the determined types of communication medium which can be used to access the at least one electronic records database; accessing the at least one electronic records database with the retrieved instructions;
    executing the selected electronic records search request and retrieving at least one electronic record from the at least one storage location during the executing, wherein the at least one electronic record comprises results of an executed electronic records search request, at least one criterion used in formulating the electronic records search request and data related to at least one electronic database associated with the electronic records search request;

parsing the electronic records to convert one or more raw data sets into user-selectable objects;

determining at least one data parsing algorithm that should be used for parsing the at least one retrieved electronic record based upon a content of the at least one retrieved electronic record; and executing the parsing using the at least one determined data parsing algorithm; and causing the user-selectable objects to be displayed.

16. The system of claim 15 wherein at least one interface enables users to select at least one of the user-selectable objects to retrieve the raw data set associated with the selected object.

17. The system of claim 15 wherein the raw data sets comprise court case items or documents associated with a court case docket sheet.

18. The system of claim 15 wherein the electronic records comprise results of an executed electronic court case records search request, at least one criterion used in formulating the electronic court case records search request and data related to at least one electronic court case records database associated with the electronic court case records search request.

19. The system of claim 15 wherein the parsing further comprises extracting the at least one raw data set from the retrieved electronic records.

20. The system of claim 15 wherein the parsing is implemented by at least one data processing algorithm based substantially on artificial intelligence.

21. The system of claim 15 wherein the parsing further comprises filtering, sorting or analyzing the retrieved electronic records for data consistency.

22. The system of claim 15 wherein the plurality of electronic records databases comprises at least one first electronic court database accessible through the first communication medium and at least one second electronic court database accessible through the second communication medium.

23. The system of claim 15 wherein the first communication medium comprises a telephone dial-up modem connection and the second communication medium comprises an Internet connection.

24. The system of claim 15 wherein the electronic records search requests comprise court case docket sheet search requests.

25. The system of claim 15 wherein the at least one processor selecting one of the plurality of electronic records search requests to execute next based upon the one or more selection criteria further comprises the processor examining search data associated with each of the electronic records search requests and evaluating the search data using the one or more selection criteria.

26. The system of claim 25 wherein the one or more selection criteria comprise how many times an examined electronic records search request has failed, an age of the examined electronic records search request, how busy one or more databases associated with the search data are, how many phone lines are available to access the one or more databases associated with the search data, a status of the examined electronic records search request, how many attempts have been made to execute the examined electronic records search request, when the examined electronic records search request was last updated, and when any activity associated with the examined electronic records search request last took place.

27. The system of claim 15 wherein one or more of the stored search requests are stored in a search database when the search request cannot be executed at the time the search request is made.

28. The system of claim 15 further comprising a document retrieval system that retrieves one or more hard-copy documents associated with a selected user-selectable object.

29. A program storage device readable by a machine tangibly embodying a program of instructions executable by the machine to perform a method for accessing electronic records obtained from at least one electronic records database search, the method enabling users to select for retrieval at least one raw data set related to the electronic records, the device comprising:

selecting one of a plurality of user input, stored electronic records search requests from a queued search database to execute next based upon one or more selection criteria;

executing the selected electronic records search request and retrieving at least one electronic record from at least one storage location during the executing;

determining which of two or more different types of communication medium can be used to access at least one of a plurality of electronic records databases associated with the selected one of the electronic records search request;

retrieving instructions for accessing the at least one of a plurality of electronic records databases based on at least one of the determined types of communication medium which can be used to access the at least one of the plurality of electronic records databases; accessing the at least one of the plurality of electronic records databases with the retrieved instructions; retrieving at least one electronic record from at least one storage location, wherein the at least one electronic record comprises results of an executed electronic records search request, at least one criterion used in formulating the electronic records search request and data related to at least one electronic database associated with the electronic records search request; parsing the electronic records to convert one or more raw data sets into user-selectable objects; determining at least one data parsing algorithm that should be used for parsing the at least one retrieved electronic record based upon a content of the at least one retrieved electronic record; executing the parsing using the at least one determined data parsing algorithm; and causing the user-selectable objects to be displayed.

30. The device of claim 29 further comprising providing at least one interface enabling users to select at least one of the user-selectable objects to retrieve the raw data set associated with the selected object.

31. The device of claim 29 wherein the raw data sets comprise court case items or documents associated with a court case docket sheet.

32. The device of claim 29 wherein the electronic records comprise results of an executed electronic court case records search request, at least one criterion used in formulating the electronic court case records search request and data related to at least one electronic court database associated with the electronic court case records search request.

33. The device of claim 29 wherein the parsing further comprises extracting the at least one raw data set from the retrieved electronic records.

34. The device of claim 29 wherein the parsing is implemented by at least one data processing algorithm based substantially on artificial intelligence.

35. The device of claim 29 wherein the parsing further comprises filtering, sorting or analyzing the retrieved electronic records for data consistency.

36. The device of claim 29 wherein the plurality of electronic records databases comprises at least one first electronic court database accessible through the first communication medium and at least one second electronic court database accessible through the second communication medium.

37. The device of claim 29 wherein the first communication medium comprises a telephone dial-up modem connection and the second communication medium comprises an Internet connection.

38. The device of claim 29 wherein the electronic records search requests comprise court case docket sheet search requests.

39. The device of claim 29 wherein the selecting one of the plurality of electronic records search requests to execute next based upon the one or more selection criteria further comprises examining search data associated with each of the electronic records search requests and evaluating the search data using the one or more selection criteria.

40. The device of claim 39 wherein the one or more selection criteria comprise how many times an examined electronic records search request has failed, an age of the examined electronic records search request, how busy one or more databases associated with the search data are, how many phone lines are available to access the one or more databases associated with the search data, a status of the examined electronic records search request, how many attempts have been made to execute the examined electronic records search request, when the examined electronic records search request was last updated, and when any activity associated with the examined electronic records search request last took place.

41. The device of claim 29 wherein one or more of the stored search requests are stored in a search database when the search request cannot be executed at the time the search request is made.

42. The device of claim 29 retrieving one or more hardcopy documents associated with a selected user-selectable object.

* * * * *